United States Patent
Im et al.

(10) Patent No.: US 12,066,599 B2
(45) Date of Patent: Aug. 20, 2024

(54) IMAGING LENS SYSTEM

(71) Applicant: Samsung Electro-Mechanics Co., Ltd., Suwon-si (KR)

(72) Inventors: Min Hyuk Im, Suwon-si (KR); Ju Hwa Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 508 days.

(21) Appl. No.: 16/747,735

(22) Filed: Jan. 21, 2020

(65) Prior Publication Data

US 2020/0257086 A1 Aug. 13, 2020

(30) Foreign Application Priority Data

Feb. 11, 2019 (KR) .................. 10-2019-0015653

(51) Int. Cl.
| | | |
|---|---|---|
| G02B 13/04 | (2006.01) | |
| G02B 9/64 | (2006.01) | |
| G02B 13/00 | (2006.01) | |
| H04N 23/55 | (2023.01) | |
| G02B 7/02 | (2021.01) | |
| G02B 13/18 | (2006.01) | |
| G03B 17/12 | (2021.01) | |

(52) U.S. Cl.
CPC ........... *G02B 13/0045* (2013.01); *G02B 9/64* (2013.01); *H04N 23/55* (2023.01); *G02B 7/021* (2013.01); *G02B 13/18* (2013.01); *G03B 17/12* (2013.01)

(58) Field of Classification Search
CPC ...... G02B 7/021; G02B 9/64; G02B 13/0045; G02B 13/18; G03B 17/12; H04N 5/2254
USPC .................................. 359/751, 755
See application file for complete search history.

(56) References Cited

U.S. PATENT DOCUMENTS 5,796,529 A * 8/1998 Park ................. G02B 9/62
359/759
10,571,656 B2 2/2020 Jung
11,846,759 B2 * 12/2023 Chen ................ G02B 13/0045
(Continued)

FOREIGN PATENT DOCUMENTS

| CN | 107703609 A | 2/2018 |
|---|---|---|
| CN | 207301458 U | 5/2018 |

(Continued)

OTHER PUBLICATIONS

Chinese Office Action issued on May 19, 2022, in counterpart Chinese Patent Application No. 202010084297.X (10 pages in English and 10 pages in Chinese).
Korean Office Action issued on May 5, 2024, in counterpart Korean Patent Application No. 10-2019-0015653 (11 pages in English, 7 pages in Korean).
Chinese Office Action issued on Mar. 25, 2024, in counterpart Chinese Patent Application No. 202210423306.2 (5 pages in English, 9 pages in Chinese).

*Primary Examiner* — Mahidere S Sahle
(74) *Attorney, Agent, or Firm* — NSIP Law

(57) ABSTRACT

An imaging lens system includes a first lens, a second lens, a third lens, a fourth lens, a fifth lens, a sixth lens, and a seventh lens sequentially disposed from an object side. The system satisfies TTL/f<1.0 and D23/D34<1.2, where TTL is a distance from an object-side surface of the first lens to an imaging plane, f is a focal length of the imaging lens system, D23 is a distance from an image-side surface of the second lens to an object-side surface of the third lens, and D34 is a distance from an image-side surface of the third lens to an object-side surface of the fourth lens.

14 Claims, 15 Drawing Sheets

(56) References Cited

U.S. PATENT DOCUMENTS

| | | | |
|---|---|---|---|
| 2015/0198787 A1* | 7/2015 | Kubota | G02B 9/64 |
| | | | 359/755 |
| 2016/0131874 A1* | 5/2016 | Tang | G02B 9/64 |
| | | | 359/708 |
| 2017/0059827 A1* | 3/2017 | Kubota | G02B 9/64 |
| 2017/0227734 A1 | 8/2017 | Huang | |
| 2018/0074298 A1 | 3/2018 | Jung et al. | |
| 2018/0149837 A1 | 5/2018 | Jung | |
| 2019/0121065 A1* | 4/2019 | Wenren | G02B 7/04 |
| 2020/0201002 A1* | 6/2020 | Xu | G02B 9/64 |
| 2020/0233186 A1* | 7/2020 | Lyu | G02B 13/0045 |
| 2021/0003826 A1* | 1/2021 | Wenren | G02B 13/0045 |
| 2021/0048625 A1* | 2/2021 | Yang | G02B 9/64 |
| 2021/0048645 A1 | 2/2021 | Li et al. | |

FOREIGN PATENT DOCUMENTS

| | | | | |
|---|---|---|---|---|
| CN | 108121058 A | | 6/2018 | |
| CN | 108227151 A | | 6/2018 | |
| CN | 108490587 A | | 9/2018 | |
| CN | 109254385 A | | 1/2019 | |
| CN | 109358415 A | * | 2/2019 | ......... G02B 13/0045 |
| KR | 10-2017-0051002 A | | 5/2017 | |
| KR | 10-2018-0060137 A | | 6/2018 | |

* cited by examiner

IMAGING LENS SYSTEM

CROSS-REFERENCE TO RELATED APPLICATIONS

This application claims the benefit under 35 USC 119(a) of Korean Patent Application No. 10-2019-0015653 filed on Feb. 11, 2019, in the Korean Intellectual Property Office, the entire disclosure of which is incorporated herein by reference for all purposes.

BACKGROUND

1. Field

The following description relates to an imaging lens system having seven lenses.

2. Description of Background

A compact camera is commonly mounted on a wireless terminal. For example, a compact camera may be mounted on a front surface and a back surface of such a wireless terminal. Since such a camera module is used for various purposes, such as outdoor scenery photographs, indoor portrait photographs, or the like, a performance not inferior to that of an ordinary camera is required therein. However, since the camera module is limited in terms of a mounting space by a size of the wireless terminal, it is difficult to realize a high level of performance. Therefore, a development of an imaging lens system capable of improving the performance of the compact camera without increasing the size of the compact camera is required.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An imaging lens system capable of improving a performance of a compact camera.

In one general aspect, an imaging lens system includes a first lens, a second lens, a third lens, a fourth lens, a fifth lens, a sixth lens, and a seventh lens sequentially disposed from an object side. The imaging lens system satisfies TTL/f<1.0 and D23/D34<1.2, where TTL is a distance from an object-side surface of the first lens to an imaging plane, f is a focal length of the imaging lens system, D23 is a distance from an image-side surface of the second lens to an object-side surface of the third lens, and D34 is a distance from an image-side surface of the third lens to an object-side surface of the fourth lens.

The first lens may include a convex image-side surface.

The fourth lens may include a convex image-side surface or the fifth lens may include a convex object-side surface.

Four or more of the second, third, fourth, fifth, and sixth lenses may have a negative refractive power.

The sixth lens may include a convex object-side surface or a convex image-side surface.

The imaging lens system may satisfy 1.9<TTL/(IMG_HT)<2.2, where IMG_HT is one-half of a diagonal length of the imaging plane.

A refractive index of the fourth lens or a refractive index of the fifth lens may be 1.6 or greater.

In another general aspect, an imaging lens system includes a first lens having a positive refractive power; a second lens having a negative refractive power; a third lens having a concave image-side surface; a fourth lens having a negative refractive power; a fifth lens having a refractive power; a sixth lens having a negative refractive power; and a seventh lens having a positive refractive power. The first to seventh lenses are sequentially disposed from an object side. The imaging lens system satisfies 0.15<D56/TTL, where D56 is a distance from an image-side surface of the fifth lens to an object-side surface of the sixth lens, and TTL is a distance from an object-side surface of the first lens to an imaging plane.

The fifth lens may include a convex object-side surface or a convex image-side surface.

The seventh lens may include a convex object-side surface.

The distance D56 from the image-side surface of the fifth lens to the object-side surface of the sixth lens may be greater than a distance from an image-side surface of the first lens to an object-side surface of the second lens, a distance from an image-side surface of the second lens to an object-side surface of the third lens, a distance from an image-side surface of the third lens to an object-side surface of the fourth lens, a distance from an image-side surface of the fourth lens to an object-side surface of the fifth lens, and a distance from an image-side surface of the sixth lens to an object-side surface of the seventh lens.

A distance from an image-side surface of the first lens to an object-side surface of the second lens may be smaller than a distance from an image-side surface of the fourth lens to an object-side surface of the fifth lens.

A refractive index of the fourth lens and a refractive index of the fifth lens maybe 1.6 or greater.

At least four of the first, second, third, fourth, fifth, sixth, and seventh lenses may have a refractive index of 1.6 or greater.

The third lens or the fifth lens may have a negative refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
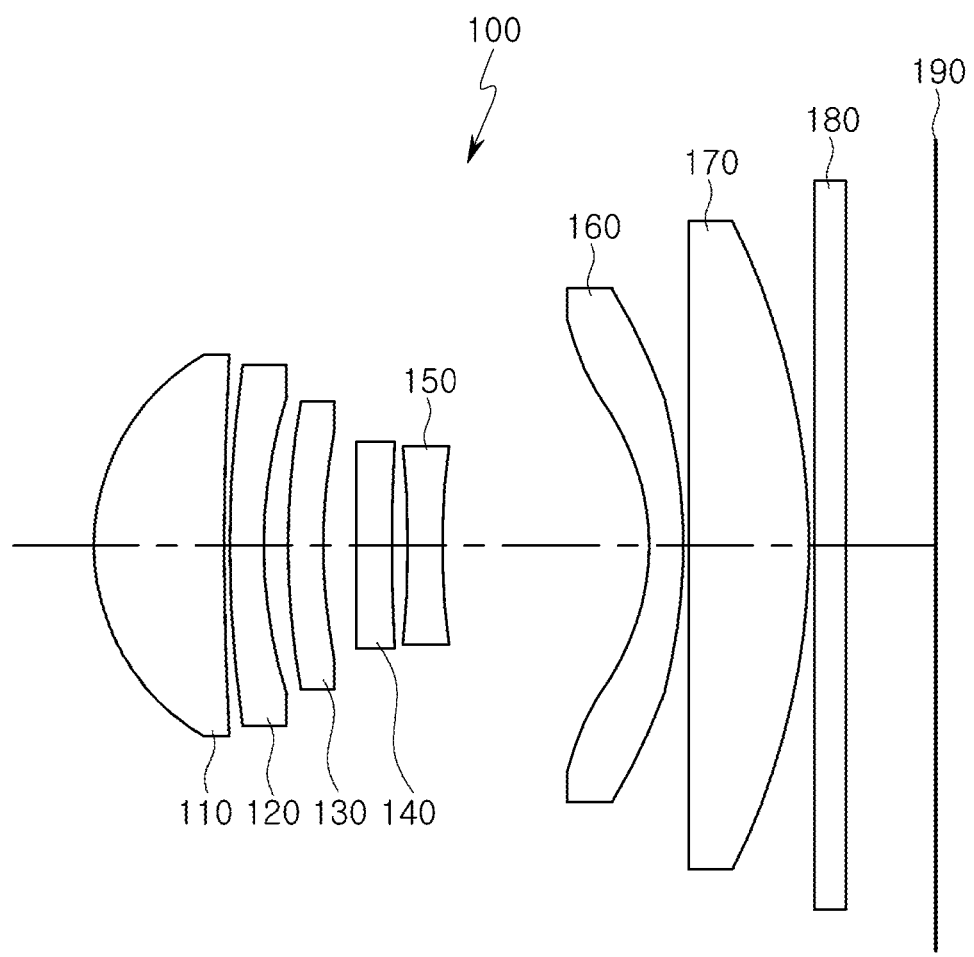
FIG. 1 is a configuration diagram of an imaging lens system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described as follows with reference to the attached drawings.

The present disclosure may, however, be exemplified in many different forms and should not be construed as being limited to the specific examples set forth herein.

Herein, a first lens refers to a lens closest to an object (or a subject), and a seventh lens refers to a lens closest to an imaging plane (or an image sensor). Herein, a curvature of radius, a thickness of a lens, TTL (a distance from the object-side surface of the first lens to an imaging plane), IMG_HT (1/2 of a diagonal length of the imaging plane), and a focal length of the lens may be represented by millimeters (mm).

The thickness of the lens, an interval between the lenses, and the TTL is a distance along an optical axis of the lens. In addition, in an explanation of a shape of each lens, a convex shape on one surface may mean that a paraxial region of the surface is convex, and a concave shape on one surface may mean that a paraxial region of the surface is concave. Therefore, even when one surface of the lens is described as having a convex shape, an edge portion of the lens may be concave. Similarly, even when one surface of the lens is described as having a concave shape, an edge portion of the lens may be convex.

The imaging lens system includes seven lenses. For example, the imaging lens system may include a first lens, a second lens, a third lens, a fourth lens, a fifth lens, a sixth lens, and a seventh lens, sequentially disposed from an object side. The first to seventh lenses may be disposed at predetermined intervals. For example, each lens does not contact an image-side surface and an object-side surface of neighboring lenses in the paraxial region. Therefore, in the accompanying drawings, although it may appear to be illustrated that an image-side surface of the lens on one side and an object-side surface of the lens on the other side contact each other, the image-side surface and the object-side surface between the two lenses do not actually contact each other.

The first lens has a refractive power. For example, the first lens has a positive refractive power. One surface of the first lens may be convex. For example, the first lens may have a convex object-side surface.

The first lens includes an aspherical surface. For example, both surfaces of the first lens may be aspherical. The first lens may be made of a material having high light transmittance and excellent workability. For example, the first lens may be made of a plastic material. The first lens has a low refractive index. For example, the refractive index of the first lens may be less than 1.6.

The second lens has a refractive power. For example, the second lens may have a negative refractive power. One surface of the second lens may be convex. For example, the second lens may have a convex object-side surface.

The second lens includes an aspherical surface. For example, both surfaces of the second lens may be aspherical. The second lens may be made of a material having high light transmittance and excellent workability. For example, the second lens may be made of a plastic material. The second lens has a higher refractive index than the first lens. For example, the refractive index of the second lens may be 1.6 or greater. A difference between the refractive index of the first lens and the refractive index of the second lens may be ±0.1 or greater in order to maximize an aberration improvement effect by the first and second lenses. For example, when the refractive index of the first lens is 1.55 or less, the refractive index of the second lens may be 1.65 or greater.

The third lens has a refractive power. One surface of the third lens may be convex. For example, the third lens may have a convex object-side surface.

The third lens includes an aspherical surface. For example, both surfaces of the third lens may be aspherical. The third lens may be made of a material having high light transmittance and excellent workability. For example, the third lens may be made of a plastic material. The third lens may have a refractive index generally similar to that of the first lens. For example, the refractive index of the third lens may be less than 1.6. In addition, a difference between the refractive index of the second lens and the refractive index of the third lens may be ±0.1 or greater in order to maximize an aberration improvement effect by the second lens and the third lens. For example, when the refractive index of the second lens is 1.65 or greater, the refractive index of the third lens may be 1.55 or less.

The fourth lens has a refractive power. For example, the fourth lens has a negative refractive power. One surface of the fourth lens may be convex. For example, the fourth lens may have a convex object-side surface or an image-side surface.

The fourth lens includes an aspherical surface. For example, both surfaces of the fourth lens may be all aspherical. The fourth lens may be made of a material having high light transmittance and excellent workability. For example, the fourth lens may be made of a plastic material. The fourth lens generally has the same or a similar refractive index as the second lens. For example, the refractive index of the fourth lens may be 1.6 or 1.65 or greater.

The fifth lens has a refractive power. One surface of the fifth lens may be convex. For example, the fifth lens may have a convex object-side surface or a convex image-side surface.

The fifth lens includes an aspherical surface. For example, both surfaces of the fifth lens may be aspherical. The fifth lens may be made of a material having high light transmittance and excellent workability. For example, the fifth lens may be made of a plastic material. The fifth lens generally has the same or a similar refractive index as the fourth lens. For example, the refractive index of the fifth lens may be 1.6 or 1.65 or greater.

The sixth lens has a refractive power. For example, the sixth lens has a negative refractive power. One surface of the sixth lens may be convex. For example, the sixth lens may have a convex object-side surface or a convex image-side surface. The sixth lens may have a shape having an inflection point. For example, an inflection point may be formed on at least one surface of the object-side surface and the image-side surface of the sixth lens.

The sixth lens has an aspherical surface. For example, both surfaces of the sixth lens may be aspherical. The sixth lens may be made of a material having high light transmittance and excellent workability. For example, the sixth lens may be made of a plastic material. The sixth lens generally has the same or a similar refractive index as the first lens. For example, the refractive index of the sixth lens may be less than 1.6.

The seventh lens has a refractive power. For example, the seventh lens has a positive refractive power. At least one surface of the seventh lens may be convex. For example, the seventh lens may have a shape in which an object-side surface and an image-side surface are both convex.

The seventh lens includes an aspherical surface. For example, both surfaces of the seventh lens may be aspherical. The seventh lens may be made of a material having high light transmittance and excellent workability. For example, the seventh lens may be made of a plastic material. The seventh lens has a refractive index generally similar to that of the fifth lens. For example, the refractive index of the seventh lens may be 1.6 or 1.65 or greater.

As described above, the first to seventh lenses include aspherical surfaces. The aspherical surfaces of the first to seventh lenses may be expressed by Equation 1 below.

$$Z = \frac{cr^2}{1 + \sqrt{1 - (1+k)c^2 r^2}} + Ar^4 + Br^6 + Cr^8 + Dr^{10} + Er^{12} + Fr^{14} + Gr^{16}$$ [Equation 1]

In equation 1, c is a reciprocal of a radius of curvature R of the lens, k is a conical constant, r is a distance from any point on an aspherical surface to an optical axis, A through G are aspherical surface constants, Z (or SAG) is a height in an optical axis direction from any point on an aspheric surface to an apex of the aspheric surface.

The imaging lens system further includes a filter, an image sensor, and a stop.

The filter is disposed between the seventh lens and the image sensor. The filter may block light of some wavelengths. For example, the filter may block light of infrared wavelengths. The image sensor forms an imaging plane. For example, the surface of the image sensor may form an imaging plane. The stop is disposed to adjust an amount of light incident on the lens. For example, the stop may be disposed between the second lens and the third lens, or between the third lens and the fourth lens, or between the fourth lens and the fifth lens.

The imaging lens system may satisfy one or more of the following conditional expressions:

$TTL/f<1.0$ (Conditional Expression 1)

$D23/D34<1.2$ (Conditional Expression 2)

$1.9<TTL/(IMG\_HT)<2.2$ (Conditional Expression 3)

$0.15<D56/TTL$ (Conditional Expression 4)

$D12<D45$ (Conditional Expression 5)

$12<D56/D12$ (Conditional Expression 6)

$-10<f345<-3.02$ (Conditional Expression 7)

In Conditional Expressions 1 through 7, f is a focal length of the imaging lens system, TTL is a distance from an object-side surface of the first lens to an imaging plane, D12 is a distance from an image-side surface of the first lens to an object-side surface of the second lens, D23 is a distance from an image-side surface of the second lens to an object-side surface of the third lens, D34 is a distance from an image-side surface of the third lens to an object-side surface of the fourth lens, D45 is a distance from an image-side surface of the fourth lens to an object-side surface of the fifth lens, D56 is a distance from an image-side surface of the fifth lens to an object-side surface of the sixth lens, IMG_HT is ½ of a diagonal length of the imaging plane, and f345 is a composite focal length of the third to fifth lenses.

The imaging lens system may satisfy one or more of the following conditional expressions:

$0.1<L1w/L7w<0.5$ (Conditional Expression 8)

$0.4<L1TR/L7TR<0.7$ (Conditional Expression 9)

$0.5<L1234TRavg/L7TR<0.75$ (Conditional Expression 10)

$0.5<L12345TRavg/L7TR<0.8$ (Conditional Expression 11)

In Conditional Expressions 8 though 11, L1w is a weight of the first lens [mg], L7w is a weight [mg] of the seventh lens, L1TR is a maximum diameter [mm] of the first lens, L7TR is a maximum diameter [mm] of the seventh lens, L1234TRavg is an average value [mm] of the maximum diameters of the first to fourth lenses, and L12345TRavg is an average value [mm] of the maximum diameters of the first to fifth lenses. For reference, a maximum diameter of a lens refers to a diameter including a rib of the lens.

Conditional Expressions 8 and 9 provide a weight ratio and an outer diameter ratio between the first lens and the seventh lens to facilitate a self-alignment between the lenses and an alignment by a barrel. Conditional Expressions 10 and 11 provide an outer diameter ratio between the lenses to facilitate aberration correction.

An imaging lens system according to a first example will be described with reference to FIG. 1.

An imaging lens system 100 includes a first lens 110, a second lens 120, a third lens 130, a fourth lens 140, a fifth lens 150, a sixth lens 160, and a seventh lens 170.

The first lens 110 has a positive refractive power, and has a convex object-side surface and a convex image-side surface. The second lens 120 has a negative refractive power, and has a convex object-side surface and a concave image-side surface. The third lens 130 has a negative refractive power, and has a convex object-side surface and a concave image-side surface. The fourth lens 140 has a negative refractive power, and has a convex object-side surface and a concave image-side surface. The fifth lens 150 has a negative refractive power, and has a convex object-side surface and a concave image-side surface. The sixth lens 160 has a negative refractive power, and has a concave object-side surface and a convex image-side surface. The sixth lens 160 has a shape in which an inflection point is formed on at least one of an object-side surface and an image-side surface thereof. The seventh lens 170 has a positive refractive power, and has a convex object-side surface and a convex image-side surface.

The imaging lens system 100 further includes a filter 180 and an image sensor 190. The filter 180 is disposed between the seventh lens 170 and the image sensor 190. As shown in Table 1 below, a stop may be disposed between the fourth lens 140 and the fifth lens 150.

Figure 2:
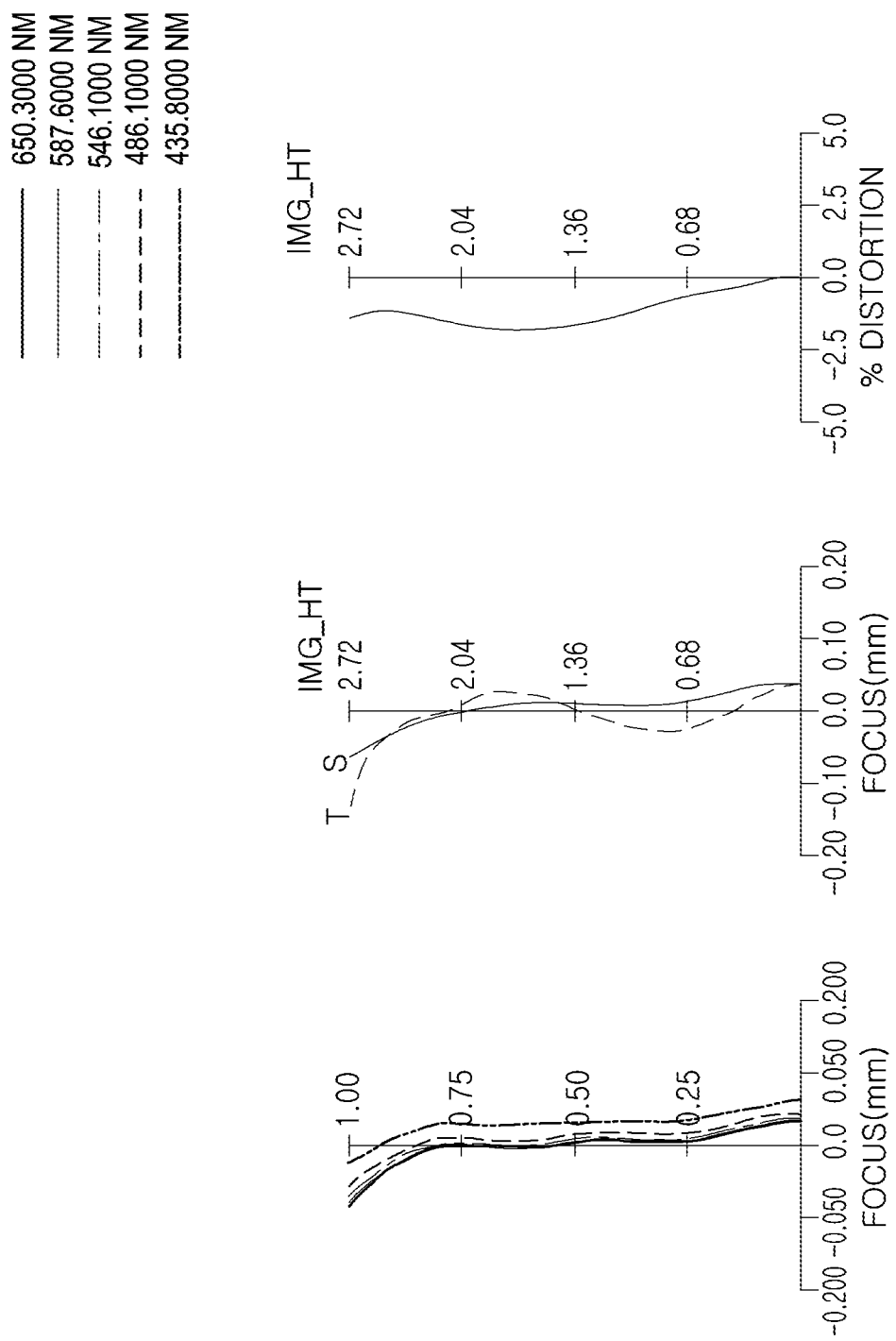
FIG. 2 illustrates aberration curves of the imaging lens system illustrated in FIG. 1.
Figure 3:
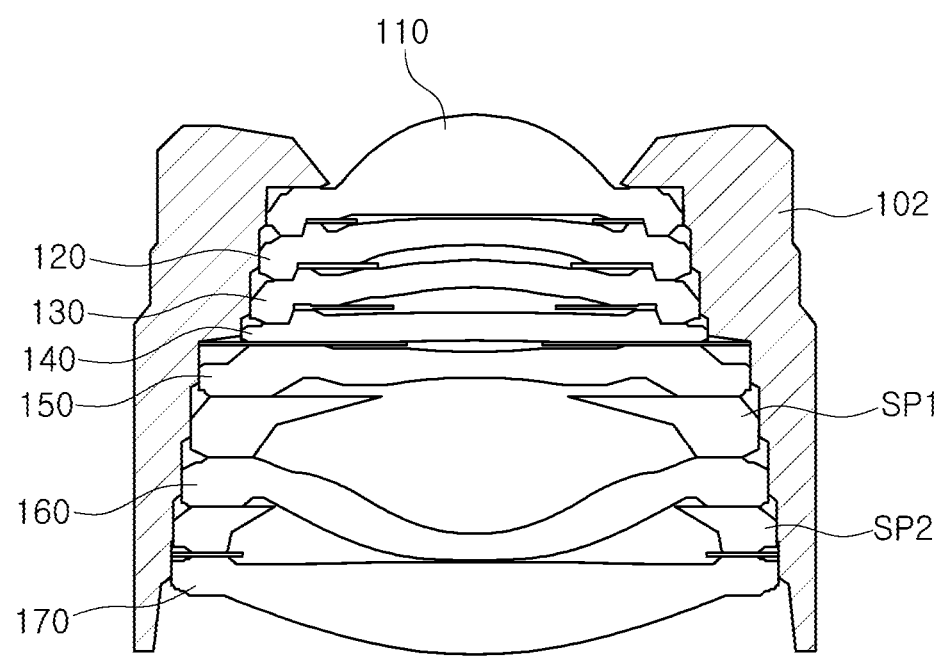
FIG. 3 is a coupling state diagram illustrating the imaging lens system illustrated in FIG. 1 and a lens barrel.
Figure 4:
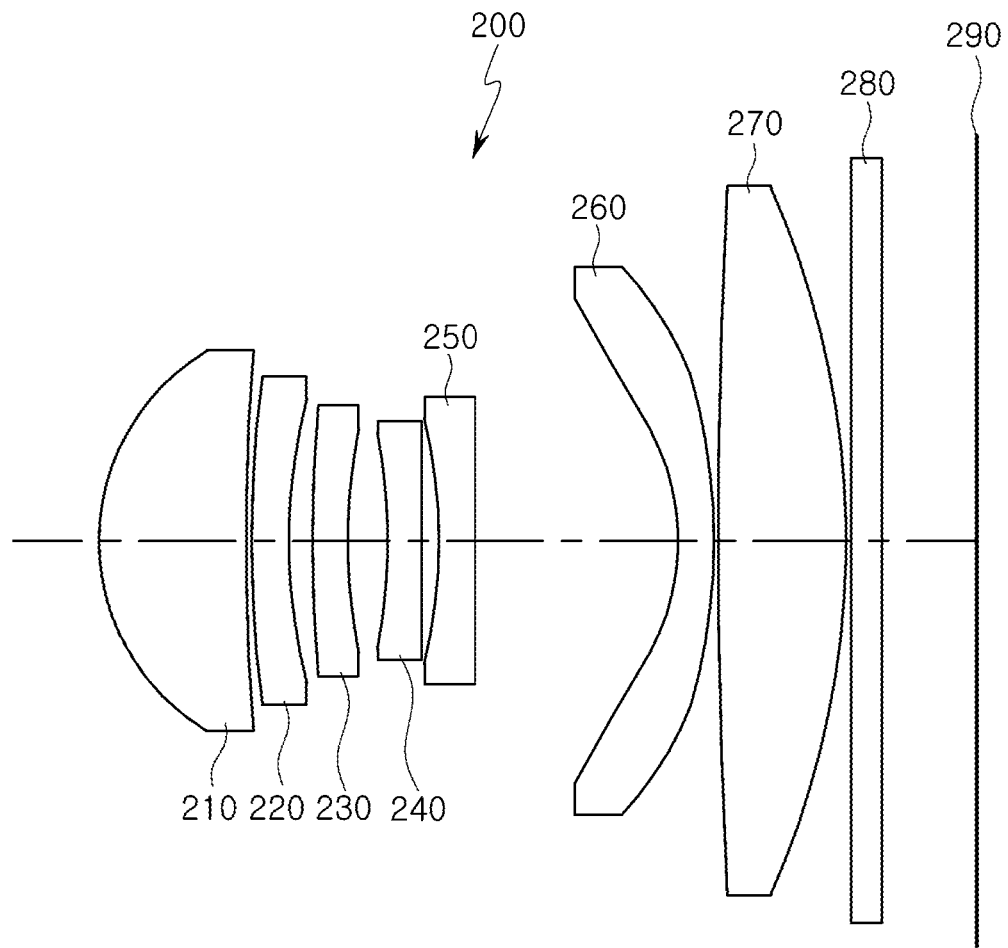
FIG. 4 is a configuration diagram of an imaging lens system according to a second example.

The imaging lens system 100 may exhibit aberration characteristics as shown in FIG. 2. The imaging lens system 100 may be coupled to a lens barrel 102 as shown in FIG. 3. In the imaging lens system 100, optical axes of the first lens 110 to the fourth lens 140 are aligned by mutual coupling. For example, edges of the second lens 120 to the fourth lens 140 do not generally contact an inner circumferential surface of the lens barrel 102. In the imaging lens system 100, the fifth lens 150 to the seventh lens 170 are coupled to the lens barrel 102 such that optical axes are aligned. That is, the fifth lens 150 to the seventh lens 170 contact the inner circumferential surface of the lens barrel 102. A light blocking member is disposed between the lenses. Gap maintenance members SP1 and SP2 are disposed between the fifth lens 150 and the sixth lens 160 and between the sixth lens 160 and the seventh lens 170.

Tables 1 and 2 show lens characteristics and aspherical values of the imaging lens system 100.

TABLE 1

| Surface No. | Element | Radius of Curvature | Thickness/ Distance | Refractive Index | Abbe Number | Effective Diameter | Focal Length |
|---|---|---|---|---|---|---|---|
| S1 | First Lens | 1.4401 | 0.924 | 1.536 | 55.656 | 1.220 | 2.4984 |
| S2 |  | −14.8468 | 0.025 |  |  | 1.301 |  |
| S3 | Second | 36.2052 | 0.240 | 1.667 | 20.353 | 1.226 | −7.0141 |
| S4 | Lens | 4.1316 | 0.147 |  |  | 1.048 |  |
| S5 | Third Lens | 6.1670 | 0.240 | 1.536 | 55.656 | 0.983 | −14.8347 |
| S6 |  | 3.4262 | 0.235 |  |  | 0.822 |  |
| S7 | Fourth | 34.7436 | 0.240 | 1.667 | 20.353 | 0.706 | −16.9656 |
| S8 | Lens | 8.5116 | 0.104 |  |  | 0.646 |  |
| S9(STOP) | Fifth Lens | 179.6534 | 0.240 | 1.667 | 20.353 | 0.600 | −7.7278 |
| S10 |  | 5.0074 | 1.408 |  |  | 0.671 |  |
| S11 | Sixth Lens | −1.6893 | 0.240 | 1.536 | 55.656 | 1.553 | −3.8232 |

TABLE 1-continued

| Surface No. | Element | Radius of Curvature | Thickness/ Distance | Refractive Index | Abbe Number | Effective Diameter | Focal Length |
|---|---|---|---|---|---|---|---|
| S12 | | −10.0899 | 0.025 | | | 1.757 | |
| S13 | Seventh | 443.9029 | 0.827 | 1.667 | 20.353 | 2.130 | 5.8181 |
| S14 | Lens | −3.9115 | 0.025 | | | 2.243 | |
| S15 | Filter | | 0.210 | 1.518 | 64.197 | 2.442 | |
| S16 | | | 0.658 | | | 2.490 | |
| S17 | Imaging Plane | | −0.038 | | | 2.766 | |

TABLE 2

| Surface No. | R | k | A | B | C | D | E | F | G |
|---|---|---|---|---|---|---|---|---|---|
| S1 | 1.44E+00 | −1.46E−01 | 1.09E−24 | −4.27E−36 | 1.00E−47 | −1.35E−59 | 1.03E−71 | −4.13E−84 | 6.79E−97 |
| S2 | −1.48E+01 | 9.98E−01 | 3.23E−02 | −3.48E−03 | −8.13E−05 | 6.17E−05 | −6.97E−06 | 3.56E−07 | −7.09E−09 |
| S3 | 3.62E+01 | 2.98E−01 | 2.09E−02 | −1.90E−03 | 1.31E−02 | −1.14E−02 | 4.22E−03 | −7.80E−04 | 5.77E−05 |
| S4 | 4.13E+00 | −5.10E−01 | 1.15E−02 | −1.60E−02 | −6.42E−02 | 3.15E−01 | −4.20E−01 | 2.30E−01 | −4.44E−02 |
| S5 | 6.17E+00 | 7.69E−01 | 3.04E−02 | −2.15E−01 | 5.96E−01 | −1.16E+00 | 2.01E+00 | −2.20E+00 | 9.55E−01 |
| S6 | 3.43E+00 | −1.95E+00 | 2.66E−02 | 7.67E−02 | −2.00E+00 | 9.16E+00 | −1.88E+01 | 1.80E+01 | −6.62E+00 |
| S7 | 3.47E+01 | −1.00E+00 | 6.42E−02 | −4.40E−01 | 1.03E+00 | −1.38E+00 | 9.22E−01 | −2.89E−01 | 3.45E−02 |
| S8 | 8.51E+00 | 7.43E−01 | 5.14E−02 | −4.54E−01 | 7.53E−01 | −5.00E−01 | 1.65E−01 | −2.71E−02 | 1.77E−03 |
| S9 | 1.80E+02 | 1.00E+00 | −9.01E−02 | −2.79E−01 | 2.40E−01 | −1.82E−01 | 1.16E−01 | −3.92E−02 | 4.93E−03 |
| S10 | 5.01E+00 | 4.73E+00 | −1.05E−19 | 2.44E−30 | −3.58E−41 | 3.27E−52 | −1.81E−63 | 5.54E−75 | −7.14E−87 |
| S11 | −1.69E+00 | 1.20E+01 | −3.30E−01 | 2.85E−01 | −1.11E−01 | 2.36E−02 | −2.76E−03 | 1.63E−04 | −3.79E−06 |
| S12 | −1.01E+01 | −2.71E+01 | −1.40E−01 | 7.68E−02 | −2.35E−02 | 4.11E−03 | −3.93E−04 | 1.88E−05 | −3.50E−07 |
| S13 | 4.44E+02 | 9.80E+01 | −7.30E−17 | 5.98E−24 | −1.98E−31 | 2.98E−39 | −2.07E−47 | 6.58E−56 | −7.79E−65 |
| S14 | −3.91E+00 | −4.59E+00 | −1.78E−45 | 2.94E−67 | −1.33E−89 | 3.14E−112 | −4.0E−135 | 2.59E−158 | −6.7E−182 |

An imaging lens system according to a second example will be described with reference to FIG. 3.

An imaging lens system 200 includes a first lens 210, a second lens 220, a third lens 230, a fourth lens 240, a fifth lens 250, a sixth lens 260, and a seventh lens 270.

The first lens 210 has a positive refractive power, and has a convex object-side surface and a convex image-side surface. The second lens 220 has a negative refractive power, and a convex object-side surface and a concave image-side surface. The third lens 230 has a negative refractive power, and has a convex object-side surface and a concave image-side surface. The fourth lens 240 has a negative refractive power, and has a concave object-side surface and a convex image-side surface. The fifth lens 250 has a negative refractive power, and has a concave object-side surface and a convex image-side surface. The sixth lens 260 has a negative refractive power, and has a concave object-side surface and a convex image-side surface. The sixth lens 260 has a shape in which an inflection point is formed on at least one of an object-side surface and an image-side surface thereof. The seventh lens 270 has a positive refractive power, and has a convex object-side surface and a convex image-side surface.

The imaging lens system 200 further includes a filter 280 and an image sensor 290. The filter 280 is disposed between the seventh lens 270 and the image sensor 290. As shown in Table 3 below, a stop may be disposed between the third lens 230 and the fourth lens 240.

Figure 5:
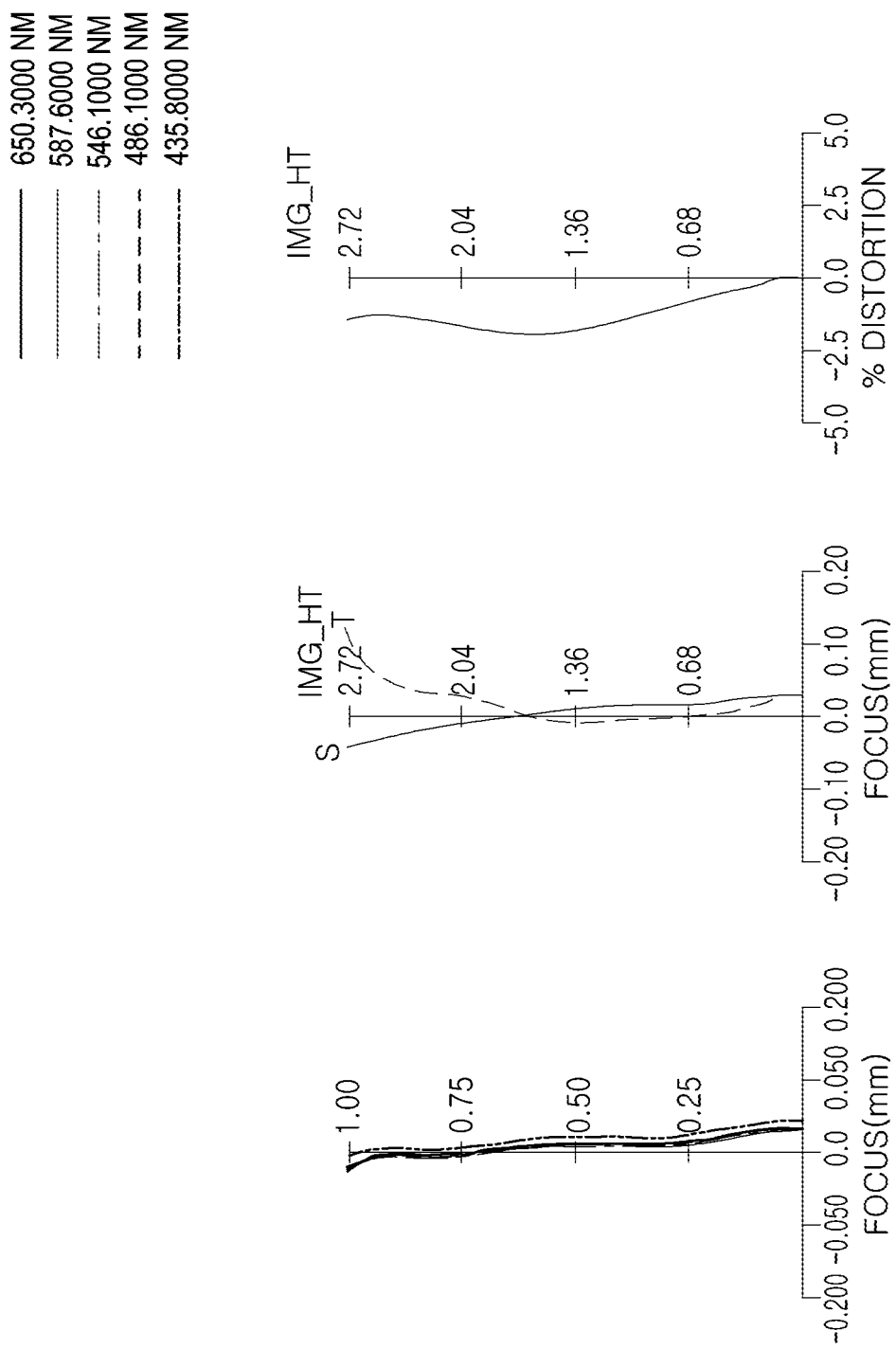
FIG. 5 illustrates aberration curves of the imaging lens system illustrated in FIG. 4.
Figure 6:
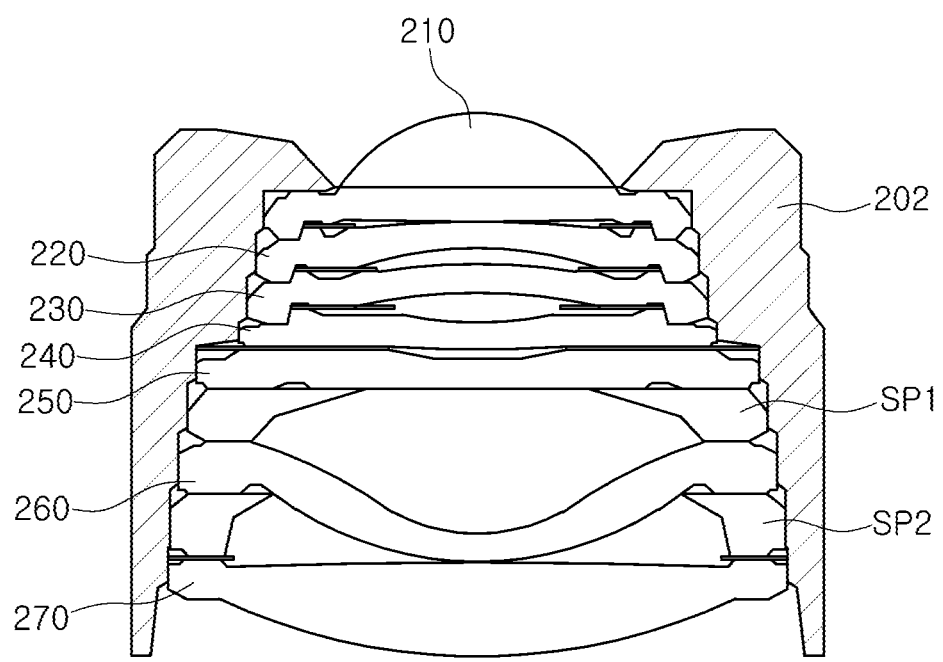
FIG. 6 is a coupling state diagram of the lens imaging system illustrated in FIG. 4 and a lens barrel.

The imaging lens system 200 may exhibit aberration characteristics as shown in FIG. 5. The imaging lens system 200 may be coupled to a lens barrel 202 as shown in FIG. 6. In the imaging lens system 200, optical axes of the first lens 210 to the fourth lens 240 are aligned by mutual coupling. For example, edges of the second lens 220 to the fourth lens 240 do not generally contact an inner circumferential surface of the lens barrel 202. In the imaging lens system 200, the fifth lens 250 to the seventh lens 270 are coupled to the lens barrel 202 such that optical axes thereof are aligned. That is, the fifth lens 250 to the seventh lens 270 contact the inner circumferential surface of the lens barrel 202. A light blocking member is disposed between the lenses. Gap maintenance members SP1 and SP2 are disposed between the fifth lens 250 and the sixth lens 260 and between the sixth lens 260 and the seventh lens 270.

Tables 3 and 4 show lens characteristics and aspherical values of the imaging lens system 200.

TABLE 3

| Surface No. | Elements | Radius of Curvature | Thickness/ Distance | Refractive Index | Abbe Number | Effective Diameter | Focal Length |
|---|---|---|---|---|---|---|---|
| S1 | First Lens | 1.4384 | 0.965 | 1.536 | 55.656 | 1.250 | 2.5933 |
| S2 | | −31.7334 | 0.025 | | | 1.120 | |
| S3 | Second | 21.1355 | 0.240 | 1.667 | 20.353 | 1.074 | −7.7593 |
| S4 | Lens | 4.1382 | 0.152 | | | 0.942 | |
| S5 | Third Lens | 7.6582 | 0.240 | 1.536 | 55.656 | 0.892 | −18.7660 |
| S6 | | 4.3005 | 0.260 | | | 0.787 | |
| S7(stop) | Fourth | −4.7789 | 0.240 | 1.667 | 20.353 | 0.709 | −7.6723 |
| S8 | Lens | −73.8095 | 0.098 | | | 0.791 | |

TABLE 3-continued

| Surface No. | Elements | Radius of Curvature | Thickness/ Distance | Refractive Index | Abbe Number | Effective Diameter | Focal Length |
|---|---|---|---|---|---|---|---|
| S9 | Fifth Lens | −19.8195 | 0.240 | 1.667 | 20.353 | 0.805 | −34.1787 |
| S10 | | −152.5856 | 1.335 | | | 0.954 | |
| S11 | Sixth Lens | −1.6650 | 0.240 | 1.536 | 55.656 | 1.592 | −3.9205 |
| S12 | | −8.4172 | 0.025 | | | 1.817 | |
| S13 | Seventh | 62.3568 | 0.836 | 1.667 | 20.353 | 2.245 | 6.4127 |
| S14 | Lens | −4.5671 | 0.025 | | | 2.337 | |
| S15 | Filter | | 0.210 | 1.518 | 64.197 | 2.485 | |
| S16 | | | 0.649 | | | 2.523 | |
| S17 | Imaging Plane | | −0.029 | | | 2.727 | |

TABLE 4

| Surface No. | R | k | A | B | C | D | E | F | G |
|---|---|---|---|---|---|---|---|---|---|
| S1 | 1.44E+00 | −1.24E−01 | 1.09E−24 | −4.27E−36 | 1.00E−47 | −1.35E−59 | 1.03E−71 | −4.13E−84 | 6.79E−97 |
| S2 | −3.17E+01 | 9.98E−01 | 2.75E−02 | −6.30E−04 | −8.84E−04 | 1.81E−04 | −1.67E−05 | 7.66E−07 | −1.41E−08 |
| S3 | 2.11E+01 | 2.98E−01 | 2.16E−02 | 1.53E−02 | −1.04E−02 | 1.97E−03 | 4.22E−04 | −2.50E−04 | 2.90E−05 |
| S4 | 4.14E+00 | −9.71E−02 | 8.21E−03 | 2.27E−02 | −6.57E−02 | 1.20E−01 | −1.30E−01 | 6.84E−02 | −1.27E−02 |
| S5 | 7.66E+00 | −2.41E+00 | 3.32E−02 | −2.13E−01 | 5.31E−01 | −8.33E−01 | 8.94E−01 | −5.43E−01 | 1.34E−01 |
| S6 | 4.30E+00 | 1.20E+00 | 6.63E−02 | −2.92E−01 | 1.66E−02 | 2.02E+00 | −5.54E+00 | 6.62E+00 | −3.16E+00 |
| S7 | −4.78E+00 | 1.00E+00 | 1.48E−01 | −8.98E−01 | 1.81E+00 | −2.06E+00 | 1.24E+00 | −3.53E−01 | 3.73E−02 |
| S8 | −7.38E+01 | 7.43E−01 | 2.05E−01 | 1.02E+00 | 1.57E+00 | 1.07E+00 | 3.72E−01 | −6.50E−02 | 4.55E−03 |
| S9 | −1.98E+01 | 1.00E+00 | 1.38E−02 | −4.89E−01 | 5.35E−01 | −4.33E−01 | 2.34E−01 | −6.70E−02 | 7.50E−03 |
| S10 | −1.53E+02 | 4.73E+00 | −1.05E−19 | 2.44E−30 | −3.58E−41 | 3.27E−52 | −1.81E−63 | 5.54E−75 | −7.14E−87 |
| S11 | −1.66E+00 | −1.20E+01 | −3.68E−01 | 3.31E−01 | −1.49E−01 | 3.81E−02 | −5.38E−03 | 3.88E−04 | −1.12E−05 |
| S12 | −8.42E+00 | −2.71E+01 | −1.47E−01 | 8.75E−02 | −2.83E−02 | 4.56E−03 | −3.84E−04 | 1.61E−05 | −2.65E−07 |
| S13 | 6.24E+01 | 9.80E+01 | −7.30E−17 | 5.98E−24 | −1.98E−31 | 2.98E−39 | −2.07E−47 | 6.58E−56 | −7.79E−65 |
| S14 | −4.57E+00 | −4.46E+00 | −1.78E−45 | 2.94E−67 | −1.33E−89 | 3.14E−112 | −4.0E−135 | 2.59E−158 | −6.7E−182 |

Figure 7:
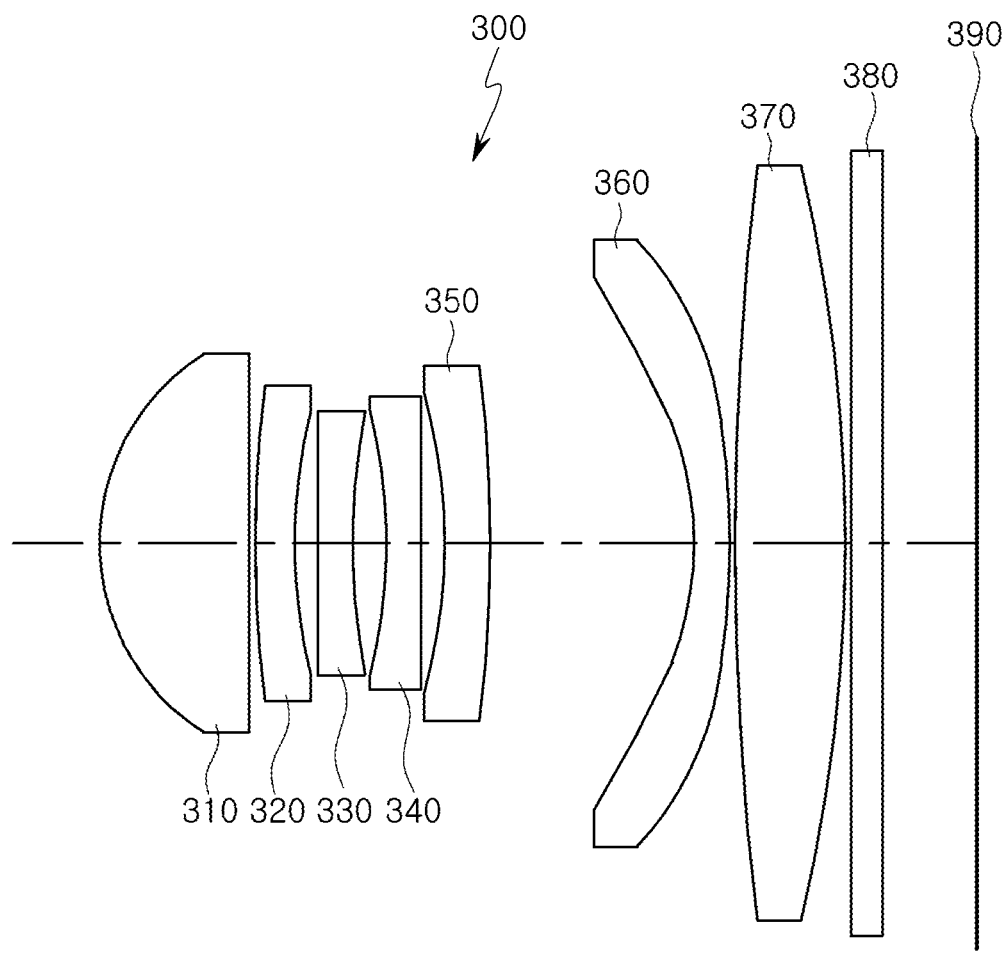
FIG. 7 is a configuration diagram of an imaging lens system according to a third example.

An imaging lens system according to a third example will be described with reference to FIG. 7.

An imaging lens system 300 includes a first lens 310, a second lens 320, a third lens 330, a fourth lens 340, a fifth lens 350, a sixth lens 360, and a seventh lens 370.

The first lens 310 has a positive refractive power, and has a convex object-side surface and a convex image-side surface. The second lens 320 has a negative refractive power, and has a convex object-side surface and a concave image-side surface. The third lens 330 has a negative refractive power, and has a convex object-side surface and a concave image-side surface. The fourth lens 340 has a negative refractive power, and has a concave object-side surface and a convex image-side surface. The fifth lens 350 has a positive refractive power, and has a concave object-side surface and a convex image-side surface. The sixth lens 360 has a negative refractive power, and has a concave object-side surface and a convex image-side surface. The sixth lens 360 has a shape in which an inflection point is formed on at least one of an object-side surface and an image-side surface thereof. The seventh lens 370 has a positive refractive power, and has a convex object-side surface and a convex image-side surface.

The imaging lens system 300 further includes a filter 380 and an image sensor 390. The filter 380 is disposed between the seventh lens 370 and the image sensor 390. As shown in Table 5 below, a stop may be disposed between the second lens 320 and the third lens 330.

Figure 8:
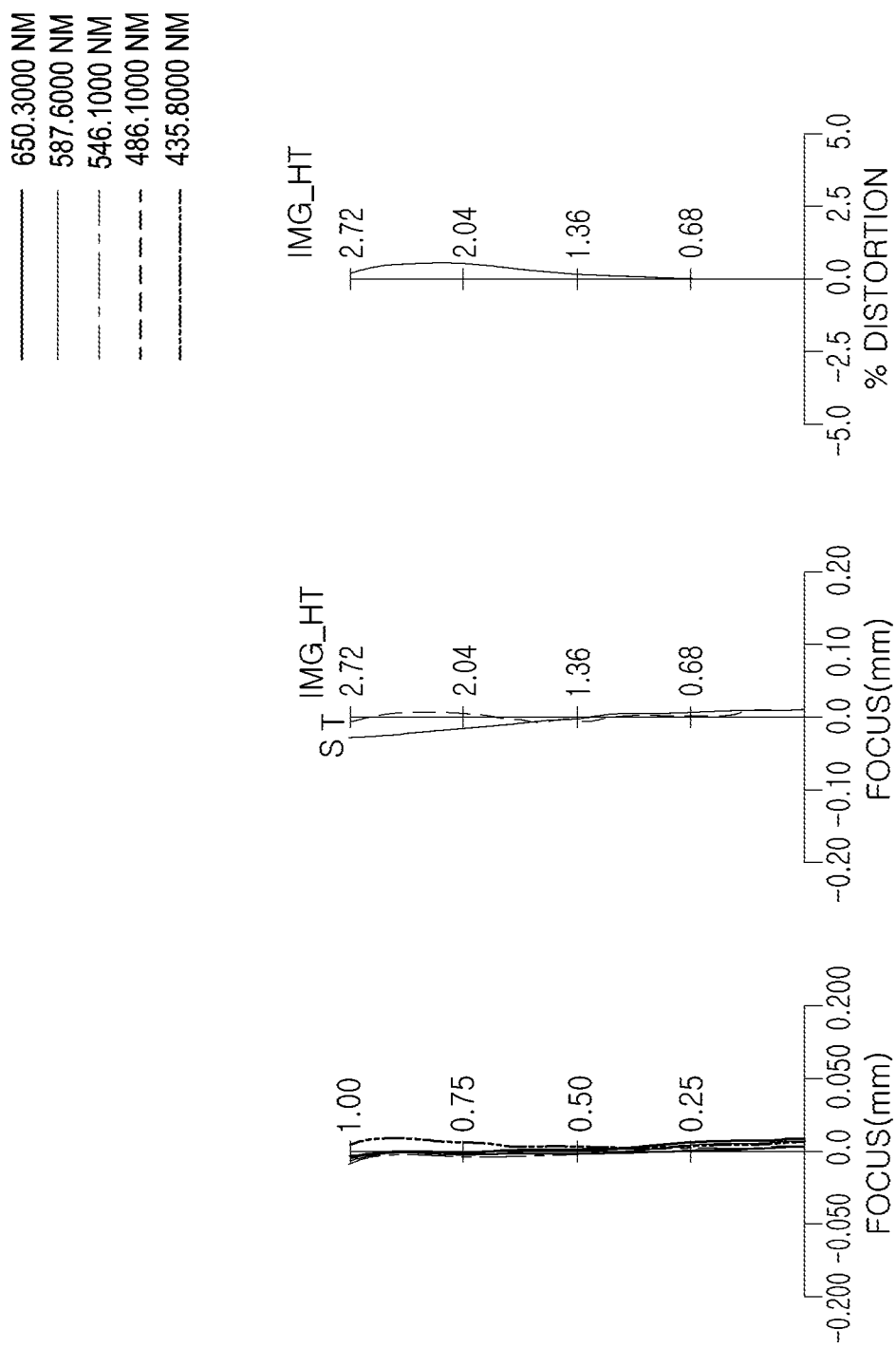
FIG. 8 illustrates aberration curves of the imaging lens system illustrated in FIG. 7.
Figure 9:
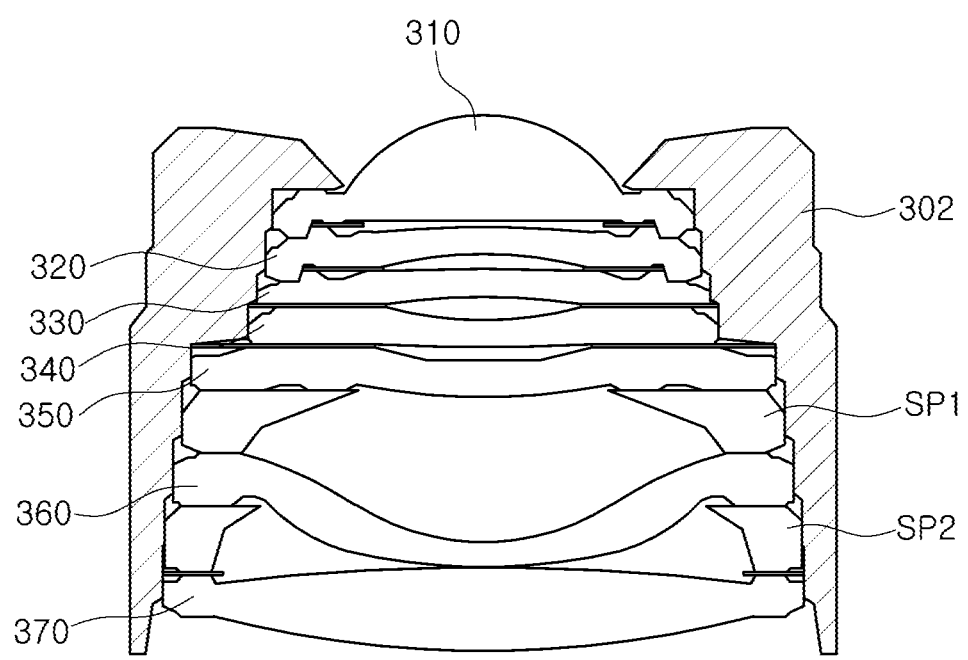
FIG. 9 is a coupling state diagram of the imaging lens system illustrated in FIG. 7 and a lens barrel.

The imaging lens system 300 may exhibit aberration characteristics as shown in FIG. 8. The imaging lens system 300 may be coupled to a lens barrel 302 as shown in FIG. 9. In the imaging lens system 300, optical axes of the first lens 310 to the third lens 330 are aligned by mutual coupling. For example, edges of the second lens 320 and the third lens 330 do not generally contact an inner circumferential surface of the lens barrel 302. In the imaging lens system 300, the fourth lens 340 to the seventh lens 370 are coupled to the lens barrel 302 such that optical axes thereof are aligned. That is, the fourth lens 340 to the seventh lens 370 contact the inner circumferential surface of the lens barrel 302. A light blocking member is disposed between the lenses. Gap maintenance members SP1 and SP2 are disposed between the fifth lens 350 and the sixth lens 360 and between the sixth lens 360 and the seventh lens 370.

Tables 5 and 6 show lens characteristics and aspherical values of the imaging lens system 300.

TABLE 5

| Surface No. | Elements | Radius of Curvature | Thickness/ Distance | Refractive Index | Abbe Number | Effective Diameter | Focal Length |
|---|---|---|---|---|---|---|---|
| S1 | First Lens | 1.4897 | 0.972 | 1.546 | 56.114 | 1.250 | 2.5834 |
| S2 | | −20.3771 | 0.060 | | | 1.120 | |
| S3 | Second | 44.9574 | 0.240 | 1.667 | 20.353 | 1.040 | −7.1535 |
| S4 | Lens | 4.3039 | 0.157 | | | 0.896 | |
| S5(Stop) | Third Lens | 107.8964 | 0.240 | 1.546 | 56.114 | 0.874 | −10.5722 |

TABLE 5-continued

| Surface No. | Elements | Radius of Curvature | Thickness/ Distance | Refractive Index | Abbe Number | Effective Diameter | Focal Length |
|---|---|---|---|---|---|---|---|
| S6 | | 5.4743 | 0.212 | | | 0.878 | |
| S7 | Fourth | −5.0737 | 0.240 | 1.667 | 20.353 | 0.883 | −7.8885 |
| S8 | Lens | −145.1991 | 0.138 | | | 0.972 | |
| S9 | Fifth Lens | −23.0659 | 0.318 | 1.667 | 20.353 | 0.986 | 17.8609 |
| S10 | | −7.8985 | 1.325 | | | 1.166 | |
| S11 | Sixth Lens | −2.2400 | 0.240 | 1.546 | 56.114 | 1.788 | −5.3618 |
| S12 | | −9.9035 | 0.025 | | | 1.999 | |
| S13 | Seventh | 28.0445 | 0.729 | 1.667 | 20.353 | 2.422 | 11.2784 |
| S14 | Lens | −10.1719 | 0.025 | | | 2.487 | |
| S15 | Filter | | 0.210 | 1.518 | 64.197 | 2.554 | |
| S16 | | | 0.629 | | | 2.583 | |
| S17 | Imaging Plane | | −0.009 | | | 2.725 | |

TABLE 6

| Surface No. | R | k | A | B | C | D | E | F | G |
|---|---|---|---|---|---|---|---|---|---|
| S1 | 1.49E+00 | −4.76E−02 | 1.09E−24 | −4.27E−36 | 1.00E−47 | −1.35E−59 | 1.03E−71 | −4.13E−84 | 6.79E−97 |
| S2 | −2.04E+01 | 9.98E−01 | 1.50E−02 | 2.05E−03 | −1.12E−03 | 1.76E−04 | −1.41E−05 | 5.84E−07 | −9.90E−09 |
| S3 | 4.50E+01 | 2.98E−01 | 1.74E−02 | 1.94E−02 | −1.10E−02 | 7.22E−04 | 1.11E−03 | −3.83E−04 | 3.79E−05 |
| S4 | 4.30E+01 | 5.10E−01 | 1.60E−02 | 9.94E−02 | −2.94E−01 | 6.40E−01 | −7.95E−01 | 4.60E−01 | −9.62E−02 |
| S5 | 1.08E+02 | 1.00E+01 | −1.83E−02 | 1.02E−01 | −5.70E−01 | 1.51E+00 | −2.11E+00 | 1.48E+00 | −4.05E−01 |
| S6 | 5.47E+00 | 1.16E+00 | 1.99E−02 | −3.28E−02 | −2.74E−01 | 4.84E−01 | 3.52E−01 | −1.43E+00 | 1.01E+00 |
| S7 | −5.07E+00 | −1.00E+00 | 5.47E−02 | −2.42E−01 | 3.50E−02 | 4.66E−01 | −7.17E−01 | 4.12E−01 | −8.09E−02 |
| S8 | −1.45E+02 | 7.43E−01 | 5.90E−02 | −2.96E−01 | 3.70E−01 | −1.91E−01 | 4.95E−02 | −6.39E−03 | 3.29E−04 |
| S9 | −2.31E+01 | 1.00E+00 | −3.75E−02 | −1.48E−01 | 1.79E−01 | −1.86E−01 | 1.03E−01 | −2.68E−02 | 2.60E−03 |
| S10 | −7.90E+00 | 4.73E+00 | −1.05E−19 | 2.44E−30 | −3.58E−41 | 3.27E−52 | −1.81E−63 | 5.54E−75 | −7.14E−87 |
| S11 | −2.24E+00 | −1.20E+01 | −1.67E−01 | 1.17E−01 | −4.42E−02 | 9.47E−03 | −1.10E−03 | 6.49E−05 | −1.52E−06 |
| S12 | −9.90E+00 | −2.71E+01 | −6.72E−02 | 3.14E−02 | −9.15E−03 | 1.24E−03 | −8.56E−05 | 2.91E−06 | −3.87E−08 |
| S13 | 2.80E+01 | 9.80E+01 | −7.30E−17 | 5.98E−24 | −1.98E−31 | 2.98E−39 | −2.07E−47 | 6.58E−56 | −7.79E−65 |
| S14 | −1.02E+01 | −4.46E+00 | −1.78E−45 | 2.94E−67 | −1.33E−89 | 3.14E−112 | −4.0E−135 | 2.59E−158 | −6.7E−182 |

Figure 10:
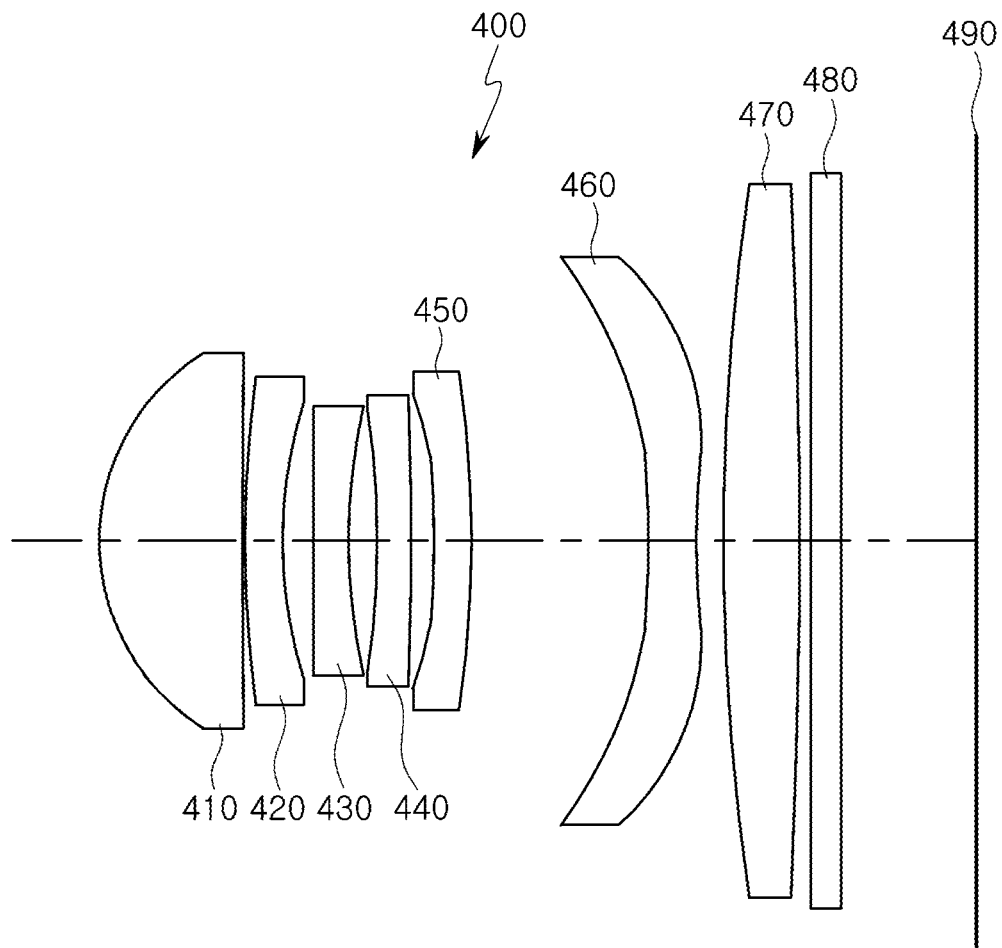
FIG. 10 is a configuration diagram of an imaging lens system according to a fourth example.

An imaging lens system according to a fourth example will be described with reference to FIG. 10.

An imaging lens system 400 includes a first lens 410, a second lens 420, a third lens 430, a fourth lens 440, a fifth lens 450, a sixth lens 460, and a seventh lens 470.

The first lens 410 has a positive refractive power, and has a convex object-side surface and a convex image-side surface. The second lens 420 has a negative refractive power, and has a convex object-side surface and a concave image-side surface. The third lens 430 has a negative refractive power, and has a convex object-side surface and a concave image-side surface. The fourth lens 440 has a negative refractive power, and has a concave object-side surface and a convex image-side surface. The fifth lens 450 has a negative refractive power, and has a concave object-side surface and a convex image-side surface. The sixth lens 460 has a negative refractive power, and has a convex object-side surface and a concave image-side surface. The sixth lens 460 has a shape in which an inflection point is formed on at least one of an object-side surface and an image-side surface thereof. The seventh lens 470 has a positive refractive power, and has a convex object-side surface and a convex image-side surface.

The imaging lens system 400 further includes a filter 480 and an image sensor 490. The filter 480 is disposed between the seventh lens 470 and the image sensor 490. As shown in Table 7 below, a stop may be disposed between the second lens 420 and the third lens 430.

Figure 11:
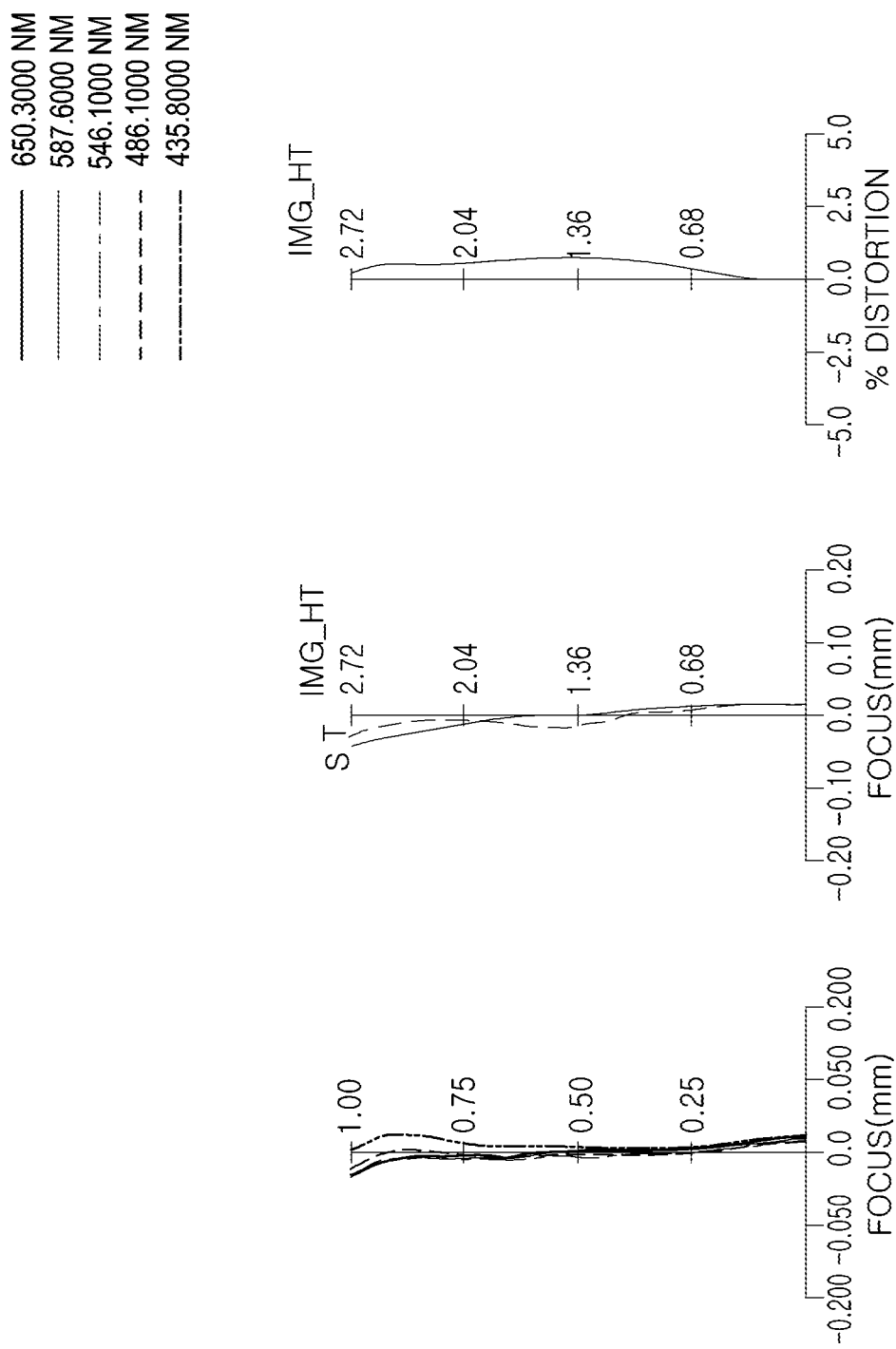
FIG. 11 illustrates aberration curves of the imaging lens system illustrated in FIG. 10.
Figure 12:
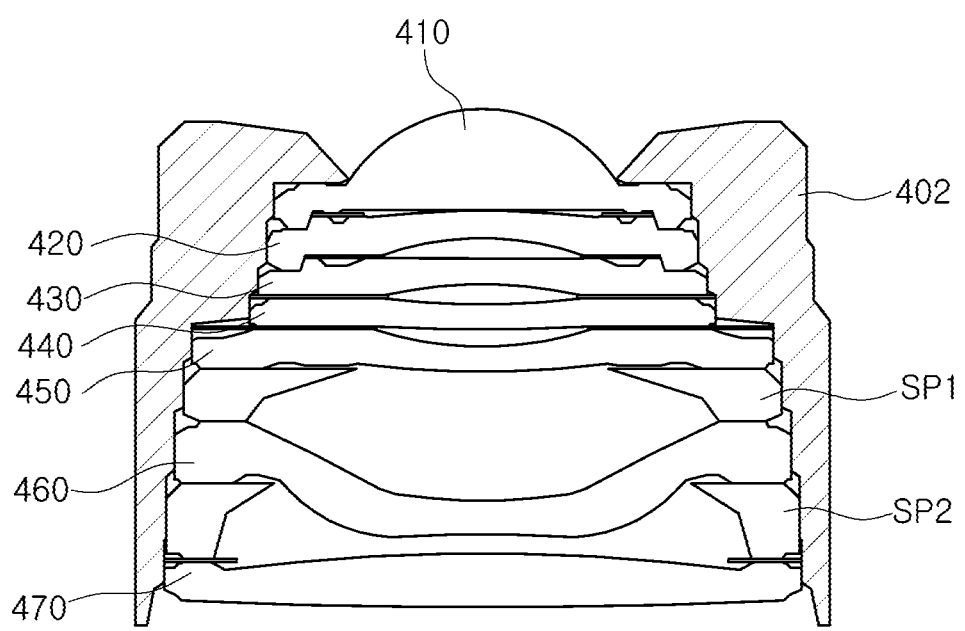
FIG. 12 is a coupling state diagram of the imaging lens system illustrated in FIG. 10 and a lens barrel.

The imaging lens system 400 may exhibit aberration characteristics as shown in FIG. 11. The imaging lens system 400 may be coupled to a lens barrel 402 as shown in FIG. 12. In the imaging lens system 400, optical axes of the first lens 410 to the third lens 430 are aligned by mutual coupling. For example, edges of the second lens 420 and the third lens 430 do not generally contact an inner circumferential surface of the lens barrel 402. In the imaging lens system 400, the fourth lens 440 to the seventh lens 470 are coupled to the lens barrel 402 such that optical axes thereof are aligned. That is, the fourth lens 440 to the seventh lens 470 contact the inner circumferential surface of the lens barrel 402. A light blocking member is disposed between the lenses. Gap maintenance members SP1 and SP2 are disposed between the fifth lens 450 and the sixth lens 460 and between the sixth lens 460 and the seventh lens 470.

Tables 7 and 8 show lens characteristics and aspherical values of the imaging lens system 400.

TABLE 7

| Surface No. | Element | Radius of Curvature | Thickness/ Distance | Refractive Index | Abbe Number | Effective Diameter | Focal Length |
|---|---|---|---|---|---|---|---|
| S1 | First Lens | 1.4908 | 0.933 | 1.546 | 56.114 | 1.250 | 2.5993 |
| S2 | | −22.9677 | 0.026 | | | 1.140 | |

TABLE 7-continued

| Surface No. | Element | Radius of Curvature | Thickness/ Distance | Refractive Index | Abbe Number | Effective Diameter | Focal Length |
|---|---|---|---|---|---|---|---|
| S3 | Second | 39.2293 | 0.240 | 1.667 | 20.353 | 1.086 | −6.0071 |
| S4 | Lens | 3.6261 | 0.191 | | | 0.936 | |
| S5(Stop) | Third Lens | 38.3315 | 0.240 | 1.546 | 56.114 | 0.897 | −9.2193 |
| S6 | | 4.4391 | 0.172 | | | 0.902 | |
| S7 | Fourth | −31.0554 | 0.240 | 1.667 | 20.353 | 0.907 | −61.2875 |
| S8 | Lens | −129.6795 | 0.142 | | | 0.974 | |
| S9 | Fifth Lens | −8.2724 | 0.240 | 1.667 | 20.353 | 0.984 | −119.5553 |
| S10 | | −9.3371 | 1.171 | | | 1.123 | |
| S11 | Sixth Lens | 140.1097 | 0.318 | 1.546 | 56.114 | 1.686 | −8.2798 |
| S12 | | 4.3754 | 0.185 | | | 1.890 | |
| S13 | Seventh | 26.1810 | 0.484 | 1.667 | 20.353 | 2.307 | 27.9060 |
| S14 | Lens | −63.8930 | 0.078 | | | 2.365 | |
| S15 | Filter | | 0.210 | 1.518 | 64.197 | 2.402 | |
| S16 | | | 0.895 | | | 2.443 | |
| S17 | Imaging Plane | | −0.016 | | | 2.727 | |

TABLE 8

| Surface No. | R | k | A | B | C | D | E | F | G |
|---|---|---|---|---|---|---|---|---|---|
| S1 | 1.49E+00 | −3.54E−02 | 1.09E−24 | −4.27E−36 | 1.00E−47 | −1.35E−59 | 1.03E−71 | −4.13E−84 | 6.79E−97 |
| S2 | −2.30E+01 | 8.73E−01 | 2.04E−02 | −2.09E−03 | 6.20E−05 | 4.74E−06 | −6.77E−07 | 4.17E−08 | −1.02E−09 |
| S3 | 3.92E+01 | 2.98E−01 | 2.67E−02 | 6.98E−03 | −5.27E−03 | −9.02E−05 | 9.71E−04 | −3.32E−04 | 3.39E−05 |
| S4 | 3.63E+00 | 5.10E−01 | 2.08E−02 | 1.18E−01 | −4.16E−01 | 8.84E−01 | −1.03E+00 | 5.65E−01 | −1.15E−01 |
| S5 | 3.83E+01 | −1.00E+01 | −1.10E−02 | 5.96E−02 | −4.41E−01 | 1.25E+00 | −1.79E+00 | 1.25E+00 | −3.34E−01 |
| S6 | 4.44E+00 | 1.22E+00 | 3.05E−02 | −5.89E−02 | −3.56E−01 | 1.13E+00 | −1.14E+00 | 1.10E−01 | 3.66E−01 |
| S7 | −3.11E+01 | 1.00E+00 | 5.03E−02 | −2.47E−01 | 9.14E−02 | 3.61E−02 | −6.45E−01 | 3.94E−01 | −8.02E−02 |
| S8 | −1.30E+02 | 7.43E−01 | 6.05E−02 | −2.74E−01 | 3.08E−01 | −1.46E−01 | 3.51E−02 | −4.21E−03 | 2.01E−04 |
| S9 | −8.27E+00 | 1.00E+00 | −5.80E−03 | −1.48E−01 | 1.65E−01 | −1.67E−01 | 9.01E−02 | −2.25E−02 | 2.11E−03 |
| S10 | −9.34E+00 | 9.74E−01 | −1.05E−19 | 2.44E−30 | −3.58E−41 | 3.27E−52 | −1.81E−63 | 5.54E−75 | −7.13E−87 |
| S11 | 1.40E+02 | −1.22E+01 | −1.57E−01 | 4.93E−02 | −6.77E−03 | 4.71E−04 | 5.46E−06 | −3.45E−06 | 1.56E−07 |
| S12 | 4.38E+00 | −2.71E+01 | −1.21E−01 | 3.81E−02 | −9.45E−03 | 1.38E−03 | −1.10E−04 | 4.34E−06 | −6.72E−08 |
| S13 | 2.62E+01 | 9.80E+01 | −7.30E−17 | 5.98E−24 | −1.98E−31 | 2.98E−39 | −2.07E−47 | 6.58E−56 | −7.79E−65 |
| S14 | −6.39E+01 | −4.46E+00 | −1.78E−45 | 2.94E−67 | −1.33E−89 | 3.14E−112 | −4.0E−135 | 2.59E−158 | −6.7E−182 |

Figure 13:
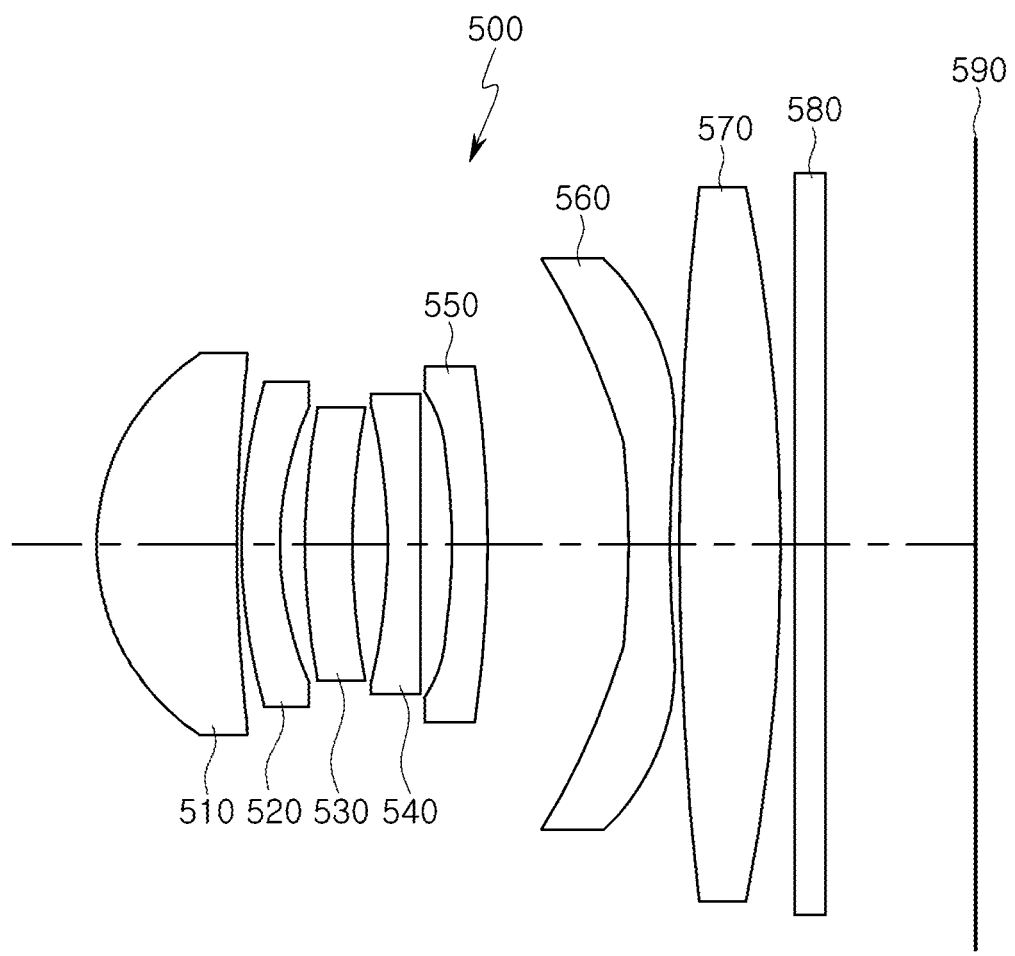
FIG. 13 is a configuration diagram of an imaging lens system according to a fifth example.

An imaging lens system according to a fifth example will be described with reference to FIG. 13.

An imaging lens system 500 includes a first lens 510, a second lens 520, a third lens 530, a fourth lens 540, a fifth lens 550, a sixth lens 560, and a seventh lens 570.

The first lens 510 has a positive refractive power, and has a convex object-side surface and a concave image-side surface. The second lens 520 has a negative refractive power, and has a convex object-side surface and a concave image-side surface. The third lens 530 has a positive refractive power, and has a convex object-side surface and a concave image-side surface. The fourth lens 540 has a negative refractive power, and has a concave object-side surface and a convex image-side surface. The fifth lens 550 has a negative refractive power, and has a concave object-side surface and a convex image-side surface. The sixth lens 560 has a negative refractive power, has a convex object-side surface and a concave image-side surface. The sixth lens 560 has a shape in which an inflection point is formed on at least one of an object-side surface and an image-side surface thereof. The seventh lens 570 has a positive refractive power, and has a convex object-side surface and a convex image-side surface.

The imaging lens system 500 further includes a filter 580 and an image sensor 590. The filter 580 is disposed between the seventh lens 570 and the image sensor 590. As shown in Table 9 below, a stop may be disposed between the second lens 520 and the third lens 530.

Figure 14:
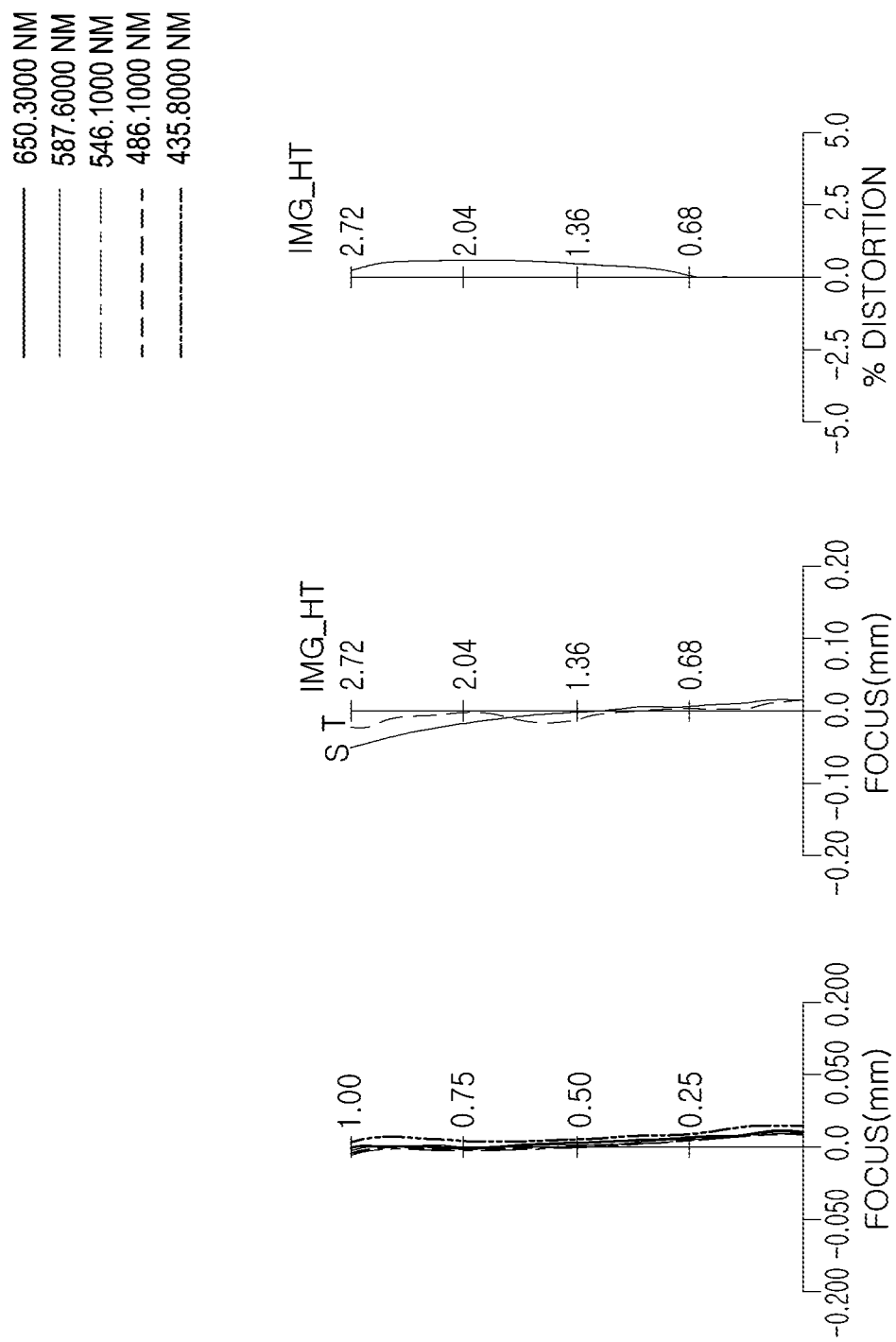
FIG. 14 illustrates aberration curves of the imaging lens system illustrated in FIG. 13.
Figure 15:
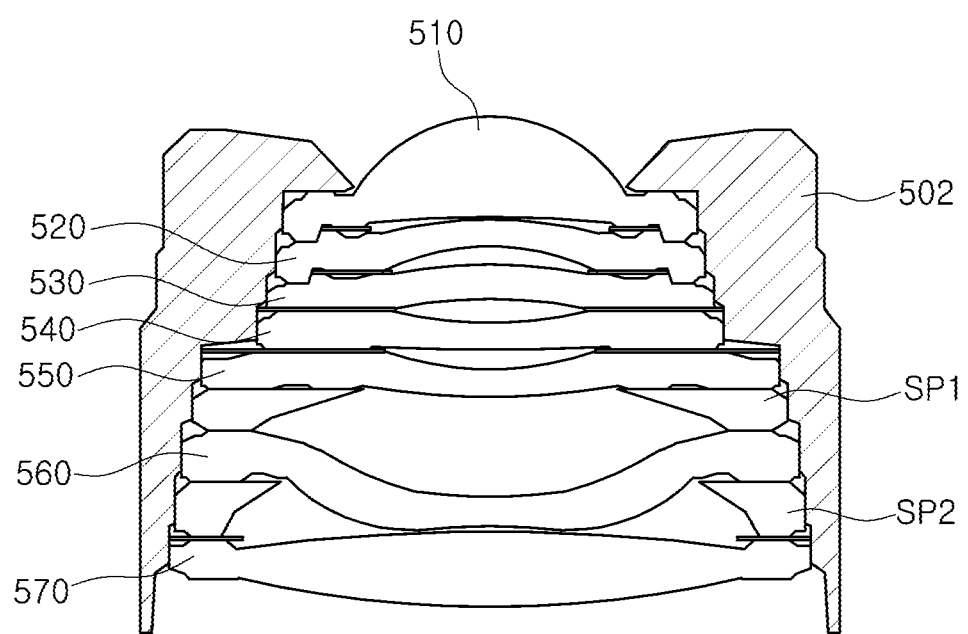
FIG. 15 is a coupling state diagram of the imaging lens system illustrated in FIG. 13 and a lens barrel.

The imaging lens system 500 may exhibit aberration characteristics as shown in FIG. 14. The imaging lens system 500 may be coupled to a lens barrel 502 as shown in FIG. 15. In the imaging lens system 500, optical axes of the first lens 510 to the third lens 530 are aligned by mutual coupling. For example, edges of the second lens 520 and the third lens 530 do not generally contact an inner circumferential surface of the lens barrel 502. In the imaging lens system 500, the fourth lens 540 to the seventh lens 570 are coupled to the lens barrel 502 such that optical axes thereof are aligned. That is, the fourth lens 540 to the seventh lens 570 contact the inner circumferential surface of the lens barrel 502. A light blocking member is disposed between the lenses. Gap maintenance members SP1 and SP2 are disposed between the fifth lens 550 and the sixth lens 560 and between the sixth lens 560 and the seventh lens 570.

Tables 9 and 10 show lens characteristics and aspherical values of the imaging lens system according to the present embodiment.

TABLE 9

| Surface No. | Element | Radius of Curvature | Thickness/ Distance | Refractive Index | Abbe Number | Effective Diameter | Focal Length |
|---|---|---|---|---|---|---|---|
| S1 | First Lens | 1.4808 | 0.900 | 1.546 | 56.114 | 1.250 | 2.9760 |
| S2 | | 13.1338 | 0.035 | | | 1.119 | |
| S3 | Second | 5.4014 | 0.240 | 1.667 | 20.353 | 1.057 | −6.9758 |
| S4 | Lens | 2.4550 | 0.172 | | | 0.923 | |
| S5(Stop) | Third Lens | 4.5408 | 0.318 | 1.546 | 56.114 | 0.884 | 335.9491 |
| S6 | | 4.5408 | 0.215 | | | 0.894 | |
| S7 | Fourth | −7.2905 | 0.240 | 1.667 | 20.353 | 0.898 | −11.6422 |
| S8 | Lens | −121.0090 | 0.188 | | | 0.981 | |
| S9 | Fifth Lens | −5.5930 | 0.240 | 1.667 | 20.353 | 0.994 | −30.6249 |
| S10 | | −7.8343 | 0.920 | | | 1.164 | |
| S11 | Sixth Lens | 11.6975 | 0.271 | 1.546 | 56.114 | 1.642 | −6.8405 |
| S12 | | 2.8075 | 0.058 | | | 1.868 | |
| S13 | Seventh | 25.5210 | 0.675 | 1.667 | 20.353 | 2.262 | 11.6187 |
| S14 | Lens | −11.0096 | 0.078 | | | 2.333 | |
| S15 | Filter | | 0.210 | 1.518 | 64.197 | 2.418 | |
| S16 | | | 1.006 | | | 2.454 | |
| S17 | Imaging Plane | | −0.017 | | | 2.726 | |

TABLE 10

| Surface No. | R | k | A | B | C |
|---|---|---|---|---|---|
| S1 | 1.4808443 | −0.0509385 | 1.0906E−24 | −4.273E−36 | −1.0019E−47 |
| S2 | 13.1338001 | 0.87344759 | 0.02324835 | −0.0084766 | 0.00215711 |
| S3 | 5.40142996 | 0.29790896 | 0.01381463 | 0.01854305 | −0.0053875 |
| S4 | 2.45504427 | 0.49457046 | −0.0084022 | 0.11971418 | −0.3404545 |
| S5 | 4.54075683 | −9.9634452 | −0.0094633 | 0.07565543 | −0.5502704 |
| S6 | 4.5407597 | −0.4942302 | 0.03155344 | −0.0990898 | −0.0047813 |
| S7 | −7.2905212 | 1 | 0.06996929 | −0.3429364 | 0.20806329 |
| S8 | −121.00903 | 0.7425981 | 0.11134166 | −0.3986371 | 0.44594738 |
| S9 | −5.592959 | 0.99999969 | 0.02264639 | −0.185241 | 0.16546609 |
| S10 | −7.8342869 | 0.97431136 | −1.054E−19 | 2.4395E−30 | −3.577E−41 |
| S11 | 11.6975126 | −12.23225 | −0.270328 | 0.14987753 | −0.0487474 |
| S12 | 2.80753027 | −27.083774 | −0.1521467 | 0.06706256 | −0.0193511 |
| S13 | 25.5210207 | 97.9999989 | −7.299E−17 | 5.9815E−24 | −1.977E−31 |
| S14 | −11.009605 | −4.4640391 | −1.78E−45 | 2.9359E−67 | −1.328E−89 |

| Surface No. | D | E | F | G |
|---|---|---|---|---|
| S1 | −1.348E−59 | 1.0277E−71 | −4.13E−84 | −6.7945E−97 |
| S2 | −0.0003127 | 2.4586E−05 | −9.827E−07 | 1.5699E−08 |
| S3 | −0.0032427 | 0.00233157 | −0.0005631 | 4.8291E−05 |
| S4 | 0.76383103 | −0.8790423 | 0.46115881 | 0.0882369 |
| S5 | 1.57324828 | −2.2289404 | 1.51761418 | −0.3900288 |
| S6 | −0.2611574 | 1.59558625 | −2.6526172 | 1.49312082 |
| S7 | 0.32764949 | −0.7214627 | 0.4712083 | −0.1002724 |
| S8 | −0.2197141 | 0.05526073 | −0.006983 | 0.00035326 |
| S9 | −0.1597956 | 0.09067572 | −0.0239789 | 0.00235142 |
| S10 | 3.2691E−52 | −1.811E−63 | 5.5378E−75 | −7.133E−87 |
| S11 | 0.00983857 | −0.0011268 | 6.6204E−05 | −1.553E−06 |
| S12 | 0.00300908 | −0.0002502 | 1.0414E−05 | −1.703E−07 |
| S13 | 2.9752E−39 | −2.067E−47 | 6.5837E−56 | −7.795E−65 |
| S14 | 3.141E−112 | −4E−135 | 2.586E−158 | −6.67E−182 |

Tables 11 and 12 show optical characteristics values of the imaging lens system according to the first to fifth examples.

TABLE 11

| Value | First Example | Second Example | Third Example | Fourth Example | Fifth Example |
|---|---|---|---|---|---|
| f | 7.00 | 6.70 | 6.20 | 6.20 | 6.20 |
| TTL | 5.75 | 5.75 | 5.75 | 5.75 | 5.75 |
| SL | 3.60 | 3.87 | 5.75 | 4.36 | 4.40 |
| CRA | 24.90 | 23.07 | 23.27 | 26.91 | 25.10 |
| F No. | 2.86 | 2.67 | 2.48 | 2.48 | 2.48 |

TABLE 11-continued

| Value | First Example | Second Example | Third Example | Fourth Example | Fifth Example |
|---|---|---|---|---|---|
| Diagonal Length of Imaging Plane | 5.53 | 5.45 | 5.45 | 5.45 | 5.45 |
| FOV | 43.40 | 44.90 | 47.35 | 47.41 | 47.40 |

TABLE 12

| Value | First Example | Second Example | Third Example | Fourth Example | Fifth Example |
|---|---|---|---|---|---|
| L1w | 5.058 | 5.420 | 5.432 | 5.196 | 5.531 |
| L2w | 4.815 | 4.752 | 4.951 | 5.054 | 4.857 |
| L3w | 3.938 | 3.836 | 3.332 | 3.587 | 3.628 |
| L4w | 3.942 | 4.597 | 5.526 | 4.605 | 5.670 |
| L5w | 8.204 | 7.685 | 9.874 | 8.532 | 8.780 |
| L6w | 8.922 | 9.916 | 11.104 | 17.367 | 14.665 |
| L7w | 13.890 | 14.516 | 15.349 | 12.290 | 14.145 |
| L1TR | 3.770 | 3.830 | 3.830 | 3.830 | 3.830 |
| L2TR | 3.920 | 3.980 | 3.970 | 3.970 | 3.970 |
| L3TR | 4.050 | 4.110 | 4.080 | 4.080 | 4.080 |
| L4TR | 4.220 | 4.280 | 4.280 | 4.280 | 4.280 |
| L5TR | 4.990 | 5.050 | 5.350 | 5.350 | 5.350 |
| L6TR | 5.320 | 5.380 | 5.680 | 5.680 | 5.680 |
| L7TR | 5.500 | 5.560 | 5.860 | 5.860 | 5.860 |
| L1234TRavg | 3.990 | 4.050 | 4.040 | 4.040 | 4.040 |
| L12345TRavg | 4.190 | 4.250 | 4.302 | 4.302 | 4.302 |

In Table 12, L1w to L7w represent weights [mg] of the first to seventh lenses, and L1TR to L7TR represent maximum diameters [mm] of the first to seventh lenses including ribs (shaded portions).

Tables 13 and 14 show conditional expression values of the imaging lens system according to the first to fifth examples.

TABLE 13

| Conditional Expression | First Example | Second Example | Third Example | Fourth Example | Fifth Example |
|---|---|---|---|---|---|
| TTL/f | 0.8214 | 0.8582 | 0.9274 | 0.9274 | 0.9274 |
| D23/D34 | 0.6248 | 0.5857 | 0.7426 | 1.1116 | 0.7995 |
| TTL/IMG_HT | 2.0794 | 2.1101 | 2.1101 | 2.1100 | 2.1101 |
| D56/TTL | 0.2449 | 0.2321 | 0.2304 | 0.2037 | 0.1600 |
| D56/D12 | 56.3297 | 53.3805 | 22.1064 | 45.4025 | 26.1065 |
| f345 | −3.8169 | −4.6620 | −6.2696 | −7.5474 | −8.8909 |

TABLE 14

| Conditional Expression | First Example | Second Example | Third Example | Fourth Example | Fifth Example |
|---|---|---|---|---|---|
| L1w/L7w | 0.3642 | 0.3734 | 0.3539 | 0.4228 | 0.3910 |
| L1TR/L7TR | 0.6855 | 0.6888 | 0.6536 | 0.6536 | 0.6536 |
| L1234TRavg/L7TR | 0.7255 | 0.7284 | 0.6894 | 0.6894 | 0.6894 |
| L12345TRavg/L7TR | 0.7618 | 0.7644 | 0.7341 | 0.7341 | 0.7341 |

The imaging lens system according to the examples may generally have the following optical characteristics. For example, a total length TTL of the imaging lens system may be in a range of 5.5 to 6.0 mm, a focal length of the imaging lens system may be in a range of 6.0 to 7.2 mm, a focal length of the first lens may be in a range of 2.3 to 3.2 mm, a focal length of the second lens may be in a range of −9.0 to −4.0 mm, a focal length of the third lens may be in a range of −10 mm or less or 100 mm or greater, a focal length of the fourth lens may be in a range of −20 to −6.0 mm, a focal length of the fifth lens may be in a range of −7 mm or less or 15 mm or greater, a focal length of the sixth lens may be in a range of −10 to −2.0 mm, and a focal length of the seventh lens may be in a range of 5.0 to 30 mm.

As set forth above, according to the examples, a performance of a camera module may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:
a total of seven lenses with refractive power,
wherein the seven lenses comprise a first lens, a second lens, a third lens, a fourth lens, a fifth lens, a sixth lens, and a seventh lens sequentially disposed in ascending numerical order along an optical axis from an object side of the imaging lens system toward an imaging plane of the imaging lens system,
wherein the first lens has a positive refractive power,
wherein the fourth lens has a convex image-side surface in a paraxial region thereof or the fifth lens has a convex object-side surface in a paraxial region thereof,
wherein the seventh lens has a convex object-side surface and a convex image-side surface in a paraxial region thereof,
wherein TTL/f<1.0, D23/D34<1.2, and a thickness of the second lens >D23, where TTL is a distance along the optical axis from an object-side surface of the first lens to the imaging plane, f is a focal length of the imaging lens system, D23 is a distance along the optical axis from an image-side surface of the second lens to an object-side surface of the third lens, D34 is a distance along the optical axis from an image-side surface of the third lens to an object-side surface of the fourth lens, and thickness of the second lens is a distance along the optical axis from an object-side surface of the second lens to the image-side surface of the second lens, and
wherein a radius of curvature of the object-side surface of the second lens is greater than a radius of curvature of an image-side surface of the sixth lens.

2. The imaging lens system of claim 1, wherein the first lens has a convex image-side surface in a paraxial region thereof.

3. The imaging lens system of claim 1, wherein four or five lenses among the second, third, fourth, fifth, and sixth lenses have a negative refractive power.

4. The imaging lens system of claim 1, wherein the sixth lens has a convex object-side surface in a paraxial region thereof or a convex image-side surface in a paraxial region thereof.

5. The imaging lens system of claim 1, wherein 1.9<TTL/(IMG_HT)<2.2, where IMG_HT is one half of a diagonal length of the imaging plane.

6. The imaging lens system of claim 1, wherein a refractive index of the fourth lens and a refractive index of the fifth lens are 1.6 or greater.

7. The imaging lens system of claim 1, wherein
the second lens has a negative refractive power,
the image-side surface of the third lens is concave in a paraxial region thereof, the fourth lens has a negative refractive power,
the fifth lens has a refractive power,
the sixth lens has a negative refractive power,
the seventh lens has a positive refractive power, and
0.15<D56/TTL, where D56 is a distance along the optical axis from an image-side surface of the fifth lens to an object-side surface of the sixth lens.

8. The imaging lens system of claim 7, wherein the fifth lens has a convex object-side surface in a paraxial region thereof or a convex image-side surface in a paraxial region thereof.

9. The imaging lens system of claim 7, wherein the distance D56 along the optical axis from the image-side surface of the fifth lens to the object-side surface of the sixth lens is greater than a distance along the optical axis from an image-side surface of the first lens to the object-side surface of the second lens, the distance along the optical axis from the image-side surface of the second lens to the object-side surface of the third lens, the distance along the optical axis from the image-side surface of the third lens to the object-side surface of the fourth lens, a distance along the optical axis from an image-side surface of the fourth lens to an object-side surface of the fifth lens, and a distance along the optical axis from the image-side surface of the sixth lens to an object-side surface of the seventh lens.

10. The imaging lens system of claim 7, wherein a distance along the optical axis from an image-side surface of the first lens to the object-side surface of the second lens is smaller than a distance along the optical axis from an image-side surface of the fourth lens to an object-side surface of the fifth lens.

11. The imaging lens system of claim 7, wherein a refractive index of the fourth lens and a refractive index of the fifth lens are 1.6 or greater.

12. The imaging lens system of claim 7, wherein four or five lenses among the first, second, third, fourth, fifth, sixth, and seventh lenses have a refractive index of 1.6 or greater.

13. The imaging lens system of claim 7, wherein the third lens or the fifth lens has a negative refractive power.

14. The imaging lens system of claim 1, wherein the fifth lens has a positive refractive power.

* * * * *